US008825876B2

(12) United States Patent
Krishnaswamy et al.

(10) Patent No.: US 8,825,876 B2
(45) Date of Patent: Sep. 2, 2014

(54) APPARATUS AND METHOD FOR MOBILE VIRTUAL NETWORK OPERATOR (MVNO) HOSTING AND PRICING

(75) Inventors: Dilip Krishnaswamy, San Diego, CA (US); Patrik N. Lundqvist, Encinitas, CA (US); Robert S. Daley, Del Mar, CA (US); Vladimir L. Bychkovsky, South Grafton, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 12/409,373

(22) Filed: Mar. 23, 2009

(65) Prior Publication Data

US 2010/0017861 A1 Jan. 21, 2010

Related U.S. Application Data

(60) Provisional application No. 61/081,675, filed on Jul. 17, 2008.

(51) Int. Cl.
*G06F 15/16* (2006.01)
*H04L 12/26* (2006.01)
*H04L 12/24* (2006.01)
*H04L 29/06* (2006.01)
*H04L 29/08* (2006.01)
*H04W 28/06* (2009.01)
*H04M 3/42* (2006.01)
*H04M 15/00* (2006.01)

(52) U.S. Cl.
CPC .............. *G06F 15/16* (2013.01); *H04L 12/26* (2013.01); *H04L 41/0896* (2013.01); *H04L 29/06* (2013.01); *H04L 29/08072* (2013.01); *H04W 28/06* (2013.01); *H04M 3/4228* (2013.01); *H04M 15/00* (2013.01)
USPC ........ 709/228; 370/230; 455/411; 455/432.1; 455/435.1

(58) Field of Classification Search
CPC ..... G06F 15/16; H04L 12/26; H04L 41/0896; H04L 29/06; H04L 29/08072; H04W 28/06; H04M 3/4238; H04M 15/00
USPC ............ 709/228; 455/405, 411, 432.1, 435.1; 370/230
See application file for complete search history.

(56) References Cited

U.S. PATENT DOCUMENTS 6,934,530 B2 * 8/2005 Engelhart ...................... 455/406
7,043,225 B1 * 5/2006 Patel et al. .................... 455/405

(Continued)

FOREIGN PATENT DOCUMENTS

| CN | 101060693 A | 10/2007 |
|---|---|---|
| DE | 10100824 | 7/2002 |

(Continued)

OTHER PUBLICATIONS

Taiwan Search Report-TW09811139-TIPO-Apr. 1, 2012.

(Continued)

*Primary Examiner* — Ondrej Vostal

(57) ABSTRACT

A method and apparatus facilitating access to a communication session for a client is provided. The method may comprise receiving, at a mobile virtual network operator (MVNO), an access request from a client, wherein the MVNO is associated with a set of mobile network operators (MNOs), receiving, from the client, client connection parameters associated with at least one of the set of MNOs, formulating at least one option for a communication session over a network associated with at least one of the set of MNOs, the at least one option based on the client connection parameters and MVNO-connection parameters associated with the set of MNOs, and establishing a selected communication session based on the at least one option.

77 Claims, 11 Drawing Sheets

(56) References Cited

U.S. PATENT DOCUMENTS

| | | | |
|---|---|---|---|
| 7,313,398 B1* | 12/2007 | Ramahi | 455/436 |
| 7,565,141 B2 | 7/2009 | Macaluso | |
| 7,995,501 B2* | 8/2011 | Jetcheva et al. | 370/255 |
| 2003/0005148 A1 | 1/2003 | Mochizuki et al. | |
| 2004/0003032 A1* | 1/2004 | Ma et al. | 709/203 |
| 2004/0081118 A1 | 4/2004 | Mukherjee et al. | |
| 2004/0162058 A1* | 8/2004 | Mottes | 455/411 |
| 2004/0196858 A1* | 10/2004 | Tsai et al. | 370/401 |
| 2004/0218605 A1* | 11/2004 | Gustafsson et al. | 370/395.2 |
| 2006/0166669 A1* | 7/2006 | Claussen | 455/435.3 |
| 2006/0293028 A1 | 12/2006 | Gadamsetty et al. | |
| 2007/0076857 A1* | 4/2007 | Chava et al. | 379/88.17 |
| 2007/0130046 A1* | 6/2007 | Khan et al. | 705/37 |
| 2007/0167182 A1* | 7/2007 | Tenhunen et al. | 455/512 |
| 2007/0184819 A1* | 8/2007 | Barriga-Caceres et al. | 455/411 |
| 2007/0201361 A1* | 8/2007 | Kumar et al. | 370/230 |
| 2007/0265021 A1 | 11/2007 | Igaue et al. | |
| 2007/0286082 A1* | 12/2007 | Hikspoors et al. | 370/238 |
| 2008/0085707 A1 | 4/2008 | Fadell | |
| 2008/0109528 A1* | 5/2008 | Knight et al. | 709/217 |
| 2008/0161008 A1* | 7/2008 | Porat | 455/450 |
| 2008/0198036 A1* | 8/2008 | Songkakul et al. | 340/825.22 |
| 2008/0254833 A1* | 10/2008 | Keevill et al. | 455/558 |
| 2008/0298450 A1* | 12/2008 | Zhang et al. | 375/227 |
| 2009/0222657 A1* | 9/2009 | Bender et al. | 713/156 |
| 2012/0173434 A1* | 7/2012 | Mardikar et al. | 705/67 |
| 2012/0246481 A1* | 9/2012 | Guccione et al. | 713/176 |
| 2013/0239194 A1* | 9/2013 | Raleigh | 726/7 |

FOREIGN PATENT DOCUMENTS

| | | |
|---|---|---|
| JP | 2003018326 A | 1/2003 |
| JP | 2007306324 A | 11/2007 |
| WO | 2008030527 A2 | 3/2008 |
| WO | WO 2008045797 | 4/2008 |

OTHER PUBLICATIONS

International Search Report & Written Opinion-PCT/US2009/039682, International Search Authority-European Patent Office-Nov. 18, 2009.

* cited by examiner

APPARATUS AND METHOD FOR MOBILE VIRTUAL NETWORK OPERATOR (MVNO) HOSTING AND PRICING

CLAIM OF PRIORITY UNDER 35 U.S.C. §119

The present Application for Patent claims priority to Provisional Application No. 61/081,675 entitled "MVNO Hosting and Pricing Architectures" filed Jul. 17, 2008, and assigned to the assignee hereof and hereby expressly incorporated by reference herein.

BACKGROUND

1. Field

The present application relates generally to wireless communications, and more specifically to methods and systems for facilitating communication network access for a client.

2. Background

Wireless communication systems are widely deployed to provide various types of communication (e.g., voice, data, multimedia services, etc.) to multiple users. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Communications with current wireless communication systems are limited, for example, as access to such systems typically involves arranging an access agreement in advance, and/or as a connection to such systems has fixed connection parameters. Thus, improved apparatus and methods for accessing wireless communication systems are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with facilitating mobile access to a communication session for a client. According to one aspect, a method for facilitating mobile access to a communication session for a client is provided. The method can comprise receiving, at a mobile virtual network operator (MVNO), an access request from a client, wherein the MVNO is associated with a set of mobile network operators (MNOs), receiving, from the client, client connection parameters associated with at least one of the set of MNOs, formulating at least one option for a communication session over a network associated with at least one of the set of MNOs, the at least one option based on the client connection parameters and MVNO-connection parameters associated with the set of MNOs, and establishing a selected communication session based on the at least one option.

Another aspect relates to an apparatus. The apparatus can include an access module operable to receive: at a mobile virtual network operator (MVNO), an access request from the client, wherein the MVNO is associated with a set of mobile network operators (MNOs), and receive, from the client, client-connection parameters associated with at least one of the set of MNOs, a connection module operable to formulate at least one option for a communication session over a network associated with at least one of the set of MNOs, the at least one option based on the client-connection parameters and MVNO-connection parameters associated with the set of MNOs, and establish a selected communication session based on the at least one option.

Yet another aspect relates to at least one processor configured to facilitate access to a communication session for a client. The at least one processor can a first module for receiving, at a mobile virtual network operator (MVNO), an access request from a client, wherein the MVNO is associated with a set of mobile network operators (MNOs), a second module for receiving, from the client, client connection parameters associated with at least one of the set of MNOs, a third module for formulating at least one option for a communication session over a network associated with at least one of the set of MNOs, the at least one option based on the client-connection parameters and MVNO-connection parameters associated with the set of MNOs, and a fourth module for establishing a selected communication session based on the at least one option.

Still another aspect relates to a computer program product comprising a computer-readable medium. The computer-readable medium can include a first set of codes for causing a computer to receive, at a mobile virtual network operator (MVNO), an access request from a client, wherein the MVNO is associated with a set of mobile network operators (MNOs), a second set of codes for causing a computer to receive, from the client, client connection parameters associated with at least one of the set of MNOs, a third set of codes for causing the computer to formulate at least one option for a communication session over a network associated with at least one of the set of MNOs, the at least one option based on the client-connection parameters and MVNO-connection parameters associated with the set of MNOs, and a fourth set of codes for causing the computer to establish a selected communication session based on the at least one option.

Yet another aspect relates to an apparatus. The apparatus can include means for receiving, at a mobile virtual network operator (MVNO), an access request from a client, wherein the MVNO is associated with a set of mobile network operators (MNOs), means for receiving, from the client, client connection parameters associated with at least one of the set of MNOs, means for formulating at least one option for a communication session over a network associated with at least one of the set of MNOs, the at least one option based on the client-connection parameters and MVNO-connection parameters associated with the set of MNOs, and means for establishing a selected communication session based on the at least one option.

Furthermore, in accordance with one or more aspects and corresponding disclosure thereof, various aspects are described in connection with facilitating access for a client to a communication session through a mobile virtual network operator. According to one aspect, a method for facilitating access for a client to a communication session through a mobile virtual network operator is provided. The method can comprise transmitting from the client an access request to a mobile virtual network operator (MVNO), wherein the MVNO is associated with a set of mobile network operators (MNOs), transmitting from the client client-connection parameters associated with at least one of the set of MNOs, and establishing a selected communication session over a network associated with a selected MNO of the set of MNOs.

Another aspect relates to an apparatus. The apparatus can include a transmission module operable to: transmit from the client an access request to a mobile virtual network operator (MVNO), wherein the MVNO is associated with a set of mobile network operators (MNOs), and transmit from the client the access request including client-connection parameters associated with at least one of the set of MNOs, and a connection module operable to establish a selected communication session over a network associated with a selected MNO of the set of MNOs.

Yet another aspect relates to at least one processor configured to facilitate access for a client to a mobile virtual network operator. The at least one processor can include a first module for transmitting from the client an access request to a mobile virtual network operator (MVNO), wherein the MVNO is associated with a set of mobile network operators (MNOs), a second module for transmitting from the client client-connection parameters associated with at least one of the set of MNOs, and a third module for establishing a selected communication session over a network associated with a selected MNO of the set of MNOs.

Still another aspect relates to a computer program product comprising a computer-readable medium. The computer-readable medium can include a first set of codes for causing a computer to transmit from the client an access request to a mobile virtual network operator (MVNO), wherein the MVNO is associated with a set of mobile network operators (MNOs), a second set of codes for causing a computer to transmit from the client client-connection parameters associated with at least one of the set of MNOs, and a third set of codes for causing the computer to establish a selected communication session over a network associated with a selected MNO of the set of MNOs.

Yet another aspect relates to an apparatus. The apparatus can include means for transmitting from a client an access request to a mobile virtual network operator (MVNO), wherein the MVNO is associated with a set of mobile network operators (MNOs), means for transmitting from the client client-connection parameters associated with at least one of the set of MNOs, and means for establishing a selected communication session over a network associated with a selected MNO of the set of MNOs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
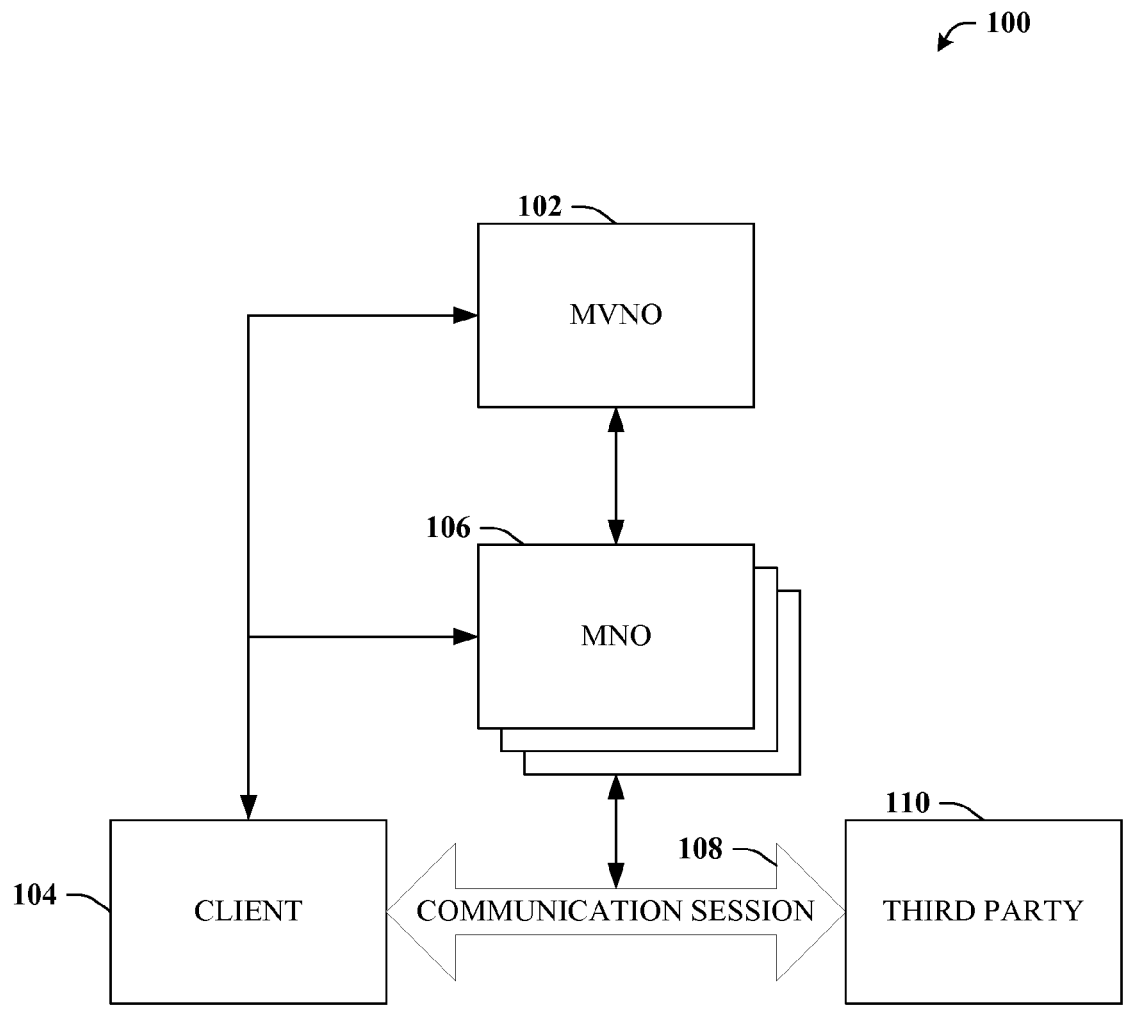
FIG. 1 illustrates a block diagram of an exemplary communication system that can provide client access to a communication session facilitated through an MVNO.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Wireless platforms may include multi-radio systems integrated into a single unit. One feature of such a multi-radio system will be an ability to access a multiplicity of wireless networks, potentially utilizing a multiplicity of wireless protocols over different frequencies. Operating characteristics for the various wireless networks such as system load and connection link quality can vary as a function of time for a given a network. In accordance therewith, various architectures for advantageously enabling heterogeneous wireless network access for a client are detailed herein. In particular, the various architectures can facilitate overall network efficiency and improved cost reduction for utilization.

In one aspect, heterogeneous wireless network access can be provided to a client by way of a heterogeneous mobile virtual network operator (MVNO). A heterogeneous MVNO (also referenced to herein as a MVNO) is a participant in wireless communications markets that provides, inter alia, wireless communication service to clients, yet typically is not the holder, owner, or licensee of frequency allocation of a spectrum. In addition, a MVNO generally lacks all or substantial portions of infrastructure for providing wireless services or features directly. In contrast, a participant in wireless communications markets that does have licensed frequency allocation as well as sufficient infrastructure to run an independent mobile network is typically known as and referred to herein as a mobile network operator (MNO). While a MVNO can have an independent clientele base and provide all or portions of products or services associated with an MNO, the MVNO may utilize the MNO for the supporting infrastructure. Generally, the MVNO purchases resources in bulk and resells these resources to its own clients. In essence, a MVNO can be similar to the "switchless resellers" of the traditional landline telephone market, wherein the switchless resellers buy minutes wholesale from large long distance companies and then resells those minutes to their own clients.

Thus, a MVNO is generally not licensed for radio frequency, but rather leases radio frequency from a MNO in order to set up a mobile virtual network. A MNO may operate in a licensed spectrum and/or in an unlicensed spectrum. However, such virtual networks can appear to the client as similar or even identical to a genuine MNO in the sense that the MVNO can, e.g., have independent SIM-cards which can be different from the SIM-cards of a MNO from whom the frequencies are leased. Appreciably, a MNO in one geographic region, yet without a frequency spectrum allocation in another geographical region, may operate as an MVNO in the second region.

A MVNO as used herein may include a heterogeneous MVNO, which can operate using substantially any of the mobile technologies the host MNO utilizes, such as one or any combination of CDMA, GSM, UMTS, Wi-Fi, WiMax, etc. Additionally, a MNO may operate in a licensed spectrum and/or in an unlicensed spectrum. Thus, the MVNO may enable a communication session based on any one of a plurality of communication technologies and any one of a plurality of communication protocols.

The roles and relationships that exist between a MVNO and a hosting MNO can vary by market, country, or the individual characteristics or situations of the MNO and MVNO. In general, an MVNO is an entity or company that works independently of the hosting MNO, and can set its own pricing structures, subject to the rates agreed upon with the hosting MNO. As noted supra, the MVNO typically does not own any GSM, CDMA or other core mobile network related infrastructure in a particular region, such as a mobile switching center (MSC), a radio access network, or the like. However, it is not uncommon for an MVNO to own a home location register (HLR), which allows more flexibility and ownership of client mobile phone number or MSISDN (e.g., a Mobile Station International Subscriber Directory Number). In such cases, the MVNO appears as a roaming partner to other networks abroad, and as the host network within its own regions. Occasionally, an MVNO will independently provide billing and customer care solutions known as BSS (Business Support Systems), which can be facilitated by a mobile virtual network enabler (MVNE). A MVNE typically provides infrastructure and services to a MVNO, but generally does not have a relationship with end-user customers such as the clients of an MVNO.

Hence, in providing heterogeneous wireless network access to a client by way of a MVNO (e.g. heterogeneous MVNO), it is readily understood that the MVNO can rely upon or have access to multiple different wireless carriers or other providers such as a MNO for frequency allocation, infrastructure, etc. Moreover, it is also readily appreciable that a mobile client device (e.g., cellular phone) can be adapted to connect to any of a set or a subset of MNOs available to the MVNO. In practice, the client device can be authenticated with credentials supplied by the client to a local wireless carrier's network (e.g., an MNO). These credentials can then be forwarded to the MVNO. Thus, the client can be registered with and authenticated by the MVNO.

Furthermore, in one aspect, pricing for a session can be dynamically based on the system load in the network and/or the link quality associated with a client. For example, under heavy load and with a bad link quality relative to the client, a carrier may choose to ask the MVNO to assign a client to a different carrier's network which may be less loaded and/or offer a better link quality. Moreover, providing these options can also aid in more efficient spectrum utilization such that a heavily loaded carrier can optimally allocate available resources to clients in the more productive manner. In addition, one or more different networks for one or more MNOs can be statistically multiplexed for optimal spectrum utilization.

In one aspect, all or a portion of control and data flow can be managed by tunneling to a server managed by the MVNO. Accordingly, handoffs can be managed by the MVNO server. Such handoffs can operate across two different MNO carriers, or operate within a single MNO network such as when changing base stations or access points within a single carrier. In other aspects, control information can be passed to the MVNO for session initiation, and subsequently all data flow can then traverse directly from the carrier's network to, e.g., the Internet without any need to propagate to the MVNO.

In various aspects, clients can be provided the option to select a carrier/MNO where the available choices are based at least in part on connection parameters retrieved by the client and/or MVNO. Furthermore, the cost of the service can be determined as a function of the system load, the link qualities, and/or the overall capacity (e.g., different wireless systems can have different capacities) in the network. Alternatively, the MVNO can choose the MNO, potentially based at least in part on connection parameters retrieved by the client and/or MVNO. It should be appreciated that it is possible for a client to be configured to utilize only a subset of available carriers/MNOs. In such cases, selection of available MNOs may be reduced accordingly.

Generally, a client may look for available networks based at least in part on radio available technologies. The client may query networks regarding their load to obtain network utilization information. Further, the client may then report available networks and the quality of links for the available networks to a server. The client may then request service from an heterogeneous MVNO along with providing client-connection parameters to the MVNO. The MVNO server may have different costs associated with different networks and may select a network with a lower cost of service in a the geographic area associated with the client. Further, the MVNO server may have load information on the available networks and may pick a network or set of networks that have reduced load. Thereafter, the MVNO may assign possible networks to the client, and/or the MVNO may select one network or a set of networks on which the client traffic may be statistically multiplexed. In one aspect, using information obtained from the MVNO, the client may connect to one of the networks or the set of networks recommended by the MVNO. Final optimization of the connection may be done at the MVNO and/or at the client.

With reference now to FIG. 1, exemplary system 100 that can provide client access to a communication session facilitated by an MVNO is depicted. Generally, system 100 can include MVNO 102 that can provide various features and services to one or more clients, such as client 104. In one aspect, heterogeneous wireless network access may be provided to a client by way of MVNO 102 (e.g. a heterogeneous MVNO), where the MVNO may rely upon or have access to MNOs from multiple different wireless carriers or other providers. Furthermore, a heterogeneous MVNO may rely upon or have access to MNOs that use various different protocols. As described supra, an MVNO (e.g., MVNO 102) generally is not the holder, owner, or licensee of frequency allocation of radio spectrum and may not manage or maintain infrastructure for providing the features or services. Accordingly, MVNO 102 can utilize a hosting MNO from a set of available MNOs referred to herein either collectively or individually as MNO 106.

Thus, in operation, when client 104 attempts to establish communication session 108 with, e.g. third party 110, MNO 106 can provide the radio spectrum and infrastructure for communication session 108, even though client 104 is associated with MVNO 102 rather than MNO 106. Third party 110 may include, for example, a website or the like (e.g. a search engine, a news site, etc.), such as when the communication session includes a data call, or another client device (e.g. a cellular phone, a landline phone, etc.), such as when the communication session includes a voice call. In one aspect, MNO 106 can receive client credentials from client 104 and forward those credentials to MVNO 102. Subsequently, MVNO 102 can authenticate client 104 for establishing communication session 108 using resources of MNO 106.

Once the communication session 108 has been established, the role of the MVNO 102 may become de minimis as the client 104 interacts with the third party 110 directly through the communication session 108 provided via the MNO 106. In one aspect, control information can be passed to the MVNO 102 for session initiation, and subsequently all data flow can then traverse directly from the serving MNO 106, e.g. the carrier network, to the third party 110 without any need to propagate to the MVNO 102. In other words, the MVNO 102 is a node that authenticates, and helps the client 104 select MNO 106 (which wireless network, what frequency to use, which carrier). Once communication session 108 is established with a given MNO 106, e.g. AT&T, Verizon, Sprint, etc., on a network, e.g. CDMA2000, UMTS, LTE, etc., with which client 104 can communicate, then the data can flow directly from client 104 to MNO 106 to the third party 110 destination, e.g. the Internet (for example, for a data session) or to some other node in the network (for example, for a voice call). Accordingly, after helping client 104 establish communication session 108, MVNO 102 may not be involved in communication session 108, although in some cases there may be some communication between MNO 106 and MVNO 102 during communication session 108. Thus, MVNO 102 is an enabler of communication session 108, but the data in communication session 108 can bypass MVNO 102 once communication session 108 is established, and, as such, client 104 is no longer accessing MVNO 102.

In another aspect, all or a portion of control and data flow can be managed by tunneling to a server managed by the MVNO 102. Accordingly, handoffs can be managed by the MVNO server. Such handoffs can operate across two different MNO carriers, and/or operate within a single MNO network such as when changing base stations or access points within a single carrier.

Figure 2:
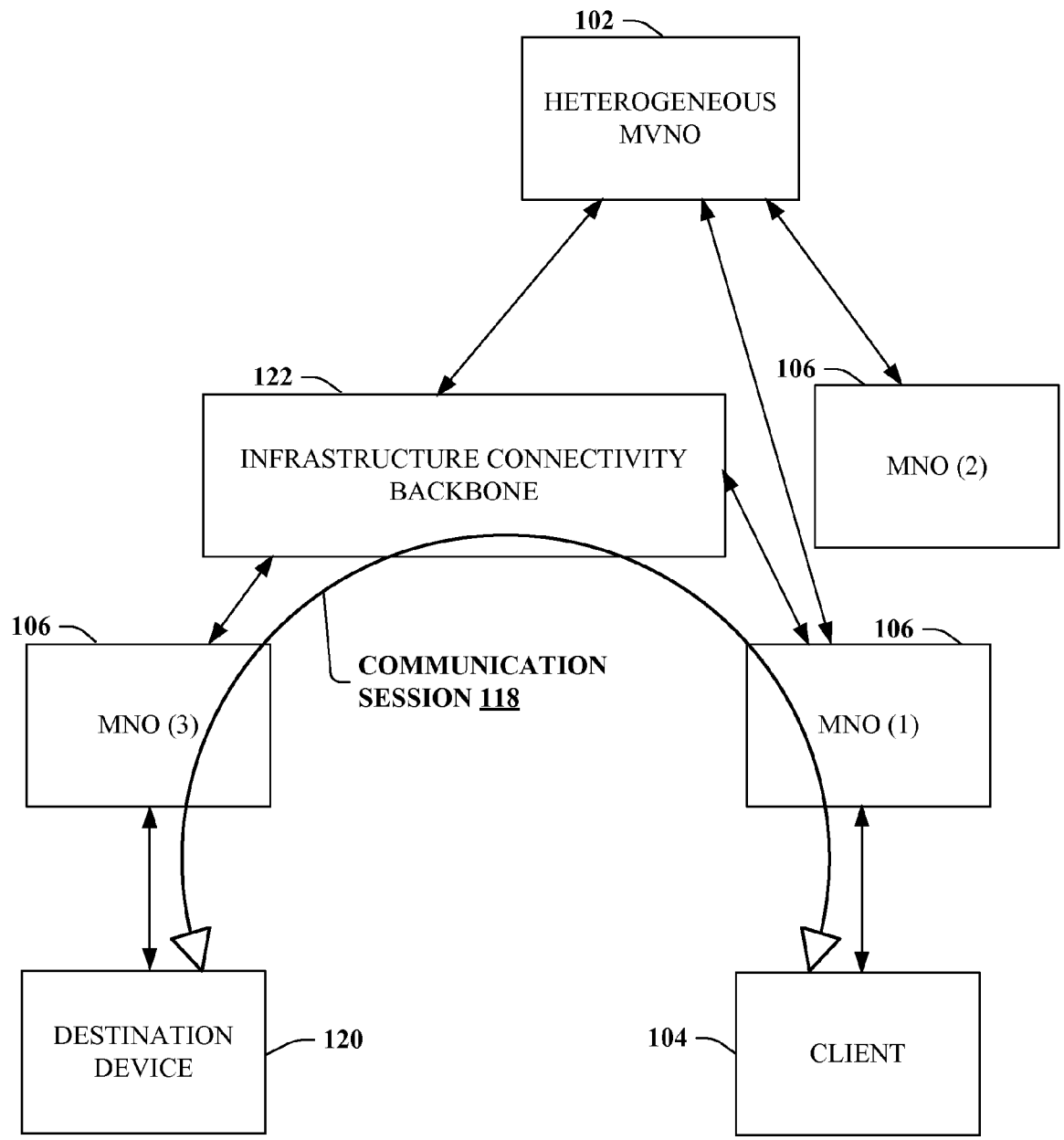
FIG. 2 illustrates a block diagram of an exemplary communication system operating to establish a communication session with a client destination device, according to the described aspects.
Figure 3:
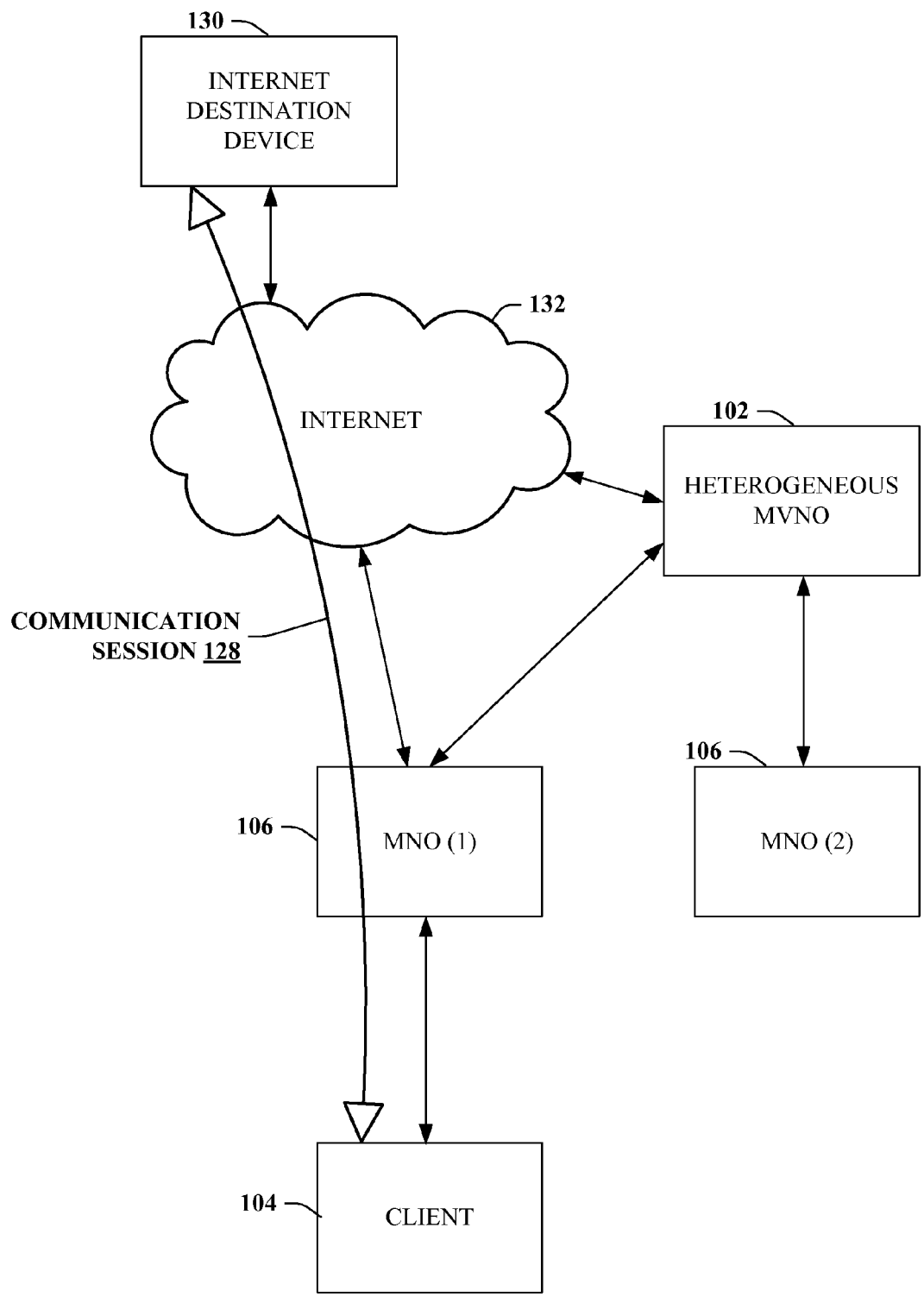
FIG. 3 illustrates a block diagram of an exemplary communication system operating to establish a communication session with a internet destination device, according to the described aspects.

Referring to FIGS. 2 and 3, examples of the system architectures are illustrated for the system operating according to the described aspects, where FIG. 2 represents a scenario where a resulting communication session 118 carries a voice call between client 104 and a destination device 120, and where FIG. 3 represents a resulting communication session 128 carrying a data call between client 104 and, for example, an Internet destination device 130, such as a web server.

As depicted in FIG. 2, a client 104 may interact with a heterogeneous MVNO 102 to establish a communication session 118 with a destination device 120. The communication session 118 being enabled through a infrastructure connectivity backbone 122 that connects a first MNO (e.g. MNO(1)) with a second MNO (e.g. MNO(3)). As depicted, the MVNO may select from a multitude of possible MNOs 106. In one aspect, the MVNO configures the communication session 108 to facilitate communication between multiple MNOs 106 and/or the client 104 and the destination device 120. Once the communication session 118 has been established, the role of the MVNO 102 may become de minimis as the client 104 interacts with the destination device 120 directly through the communication session 108 provided via the MNOs 106 and infrastructure connectivity backbone 122.

As depicted in FIG. 3, a client 104 may interact with a heterogeneous MVNO 102 to establish a communication session 128 with an internet destination device 130. The communication session 128 being enabled through a network including MNO91) and the Internet 122. In one aspect, MVNO facilitates access for the client to the Internet 132 through a selected MNO 106. As depicted, the MVNO may select from a multitude of possible MNOs 106. Once the communication session 128 has been established, the role of the MVNO 102 may become de minimis as the client 104 interacts with the destination device 120 directly through the communication session 108 provided via the MNOs 106 and infrastructure connectivity backbone 122.

Figure 4A:
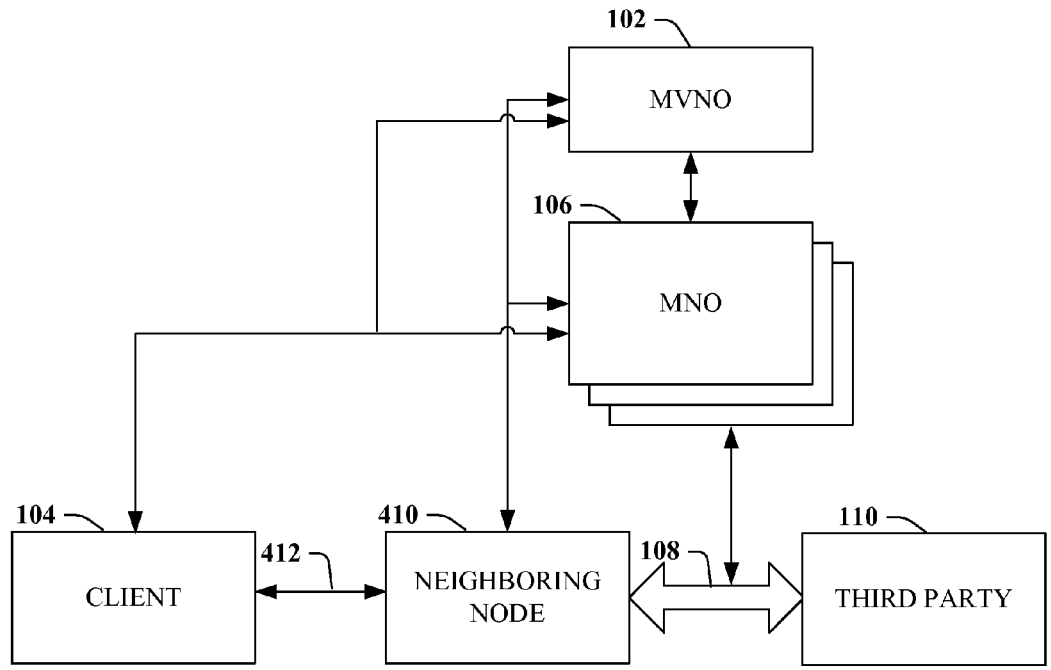
FIG. 4A illustrates a block diagram of an exemplary communication system where a client assists in setting up a communication session for a neighboring node.

Referring to FIG. 4A, another aspect is illustrated wherein client 104 assists in setting up a communication session 108 for a neighboring node 410. In this case, client 104 has the ability to interact with MVNO 102 and establish a communication session with an MNO 106, however, neighboring node 410 does not have this ability, but is able to communicate with client 104. For example, neighboring node 410 may be new or may be a visitor with respect to the communication system, and thus may not have the proper authorizations, communication software, communication protocols, etc., to enable communications with MVNO 102 or to establish a communication session with an MNO. As such, client 104 operates as a helper to put neighboring node 410 in communication with MVNO 106 to negotiate and obtain communication session 108 with MNO 106, or, optionally, client 104 may negotiate and obtain communication session 108 on behalf of neighboring node 410. In any case, neighboring node 410 ultimately receives the proper information to contact MVNO 102 and to establish communication session 108 with MNO 106, all facilitated by client 104. Further, client 104 may receive some form of compensation, such as a payment or credit, from neighboring node 410 and/or from MVNO 102 and/or MNO 106 for providing such assistance.

For example, in the depicted aspect, the client 104 exchanges access enabling information 412 with a neighboring node 410 to facilitate access to a third party 110 via communication session 108 established with MNO 106. The client 104, in effect, may sell a communication session 108 to a neighboring node by providing access enabling information 412 to permit the neighboring node 410 to establish communication session 108 via MNO 106 to access the third party 110. To initiate the process, the neighboring node 410 may provide equipment identification information such an IMEI (International Mobile Equipment Identifier) and its capabilities for WWAN communication to the client 104. Optionally, neighboring node 410 may provide a list of the specific MNOs that the neighboring node 410 can communicate with, and, optionally, link quality information as measured by the neighboring node 410 for the specific MNOs. All or some portion of such information can be communicated by the client 104 to the MVNO server 102, such as in an access request on behalf the neighboring node 410. At this point, the client 104 may act as a bridge to allow neighboring node 410 to negotiate with MVNO 102, or client 104 may perform the negotiations and report the results back to the neighboring node 410. For example, to enable neighboring node 410 to communicate with MVNO 102, the client 104 may receive a temporary IMSI (International Mobile Subscription Identifier), also known as a temporary mobile subscriber identity (TMSI), from the MVNO server 102 for use by the neighboring node 410. Further, client 104 may provide neighboring node 410 with MVNO server information, such as but not limited to, an IP address for the MVNO server, a tunneling protocol to communicate with the MVNO server, an encryption key for communicating with the MVNO server, one or more WWAN communication technologies to use, one or more available networks to use, etc., which may be already know by client 104 and/or communicated from MVNO 102, so that neighboring node 410 knows how to communicate with MVNO 102. All or some portion of this information provided by client 104 to neighboring node 410 may be referred to as access enabling information 412. The neighboring node 410 may then utilize access enabling information 412 in communications with MVNO 102, via an available MNO 106, to authenticate itself and request establishment of communication session 108. For example, based on the MVNO server information, neighboring node 410 may provide an access request, including its IMEI, the received TMSI, and at least some portion of the MVNO server information, to an available MNO 106 using a compatible WWAN communication technology, or the like. Subsequently, based on the MVNO server information, the available MNO allows neighboring node 410 to communicate with the MVNO server 102 to negotiate the communication session. Using the IMEI and the TMSI, MVNO server 102 authenticates neighboring node 410 and helps to establish communication session 108 serviced by a host MNO 106, which may be the available MNO or a different MNO. As such, the client 104 provides access enabling information 412 to the neighboring node 410, which allows neighboring node 410 to establish communication session 108 with hosting MNO 106 based on negotiations with MVNO 102.

Figure 4B:
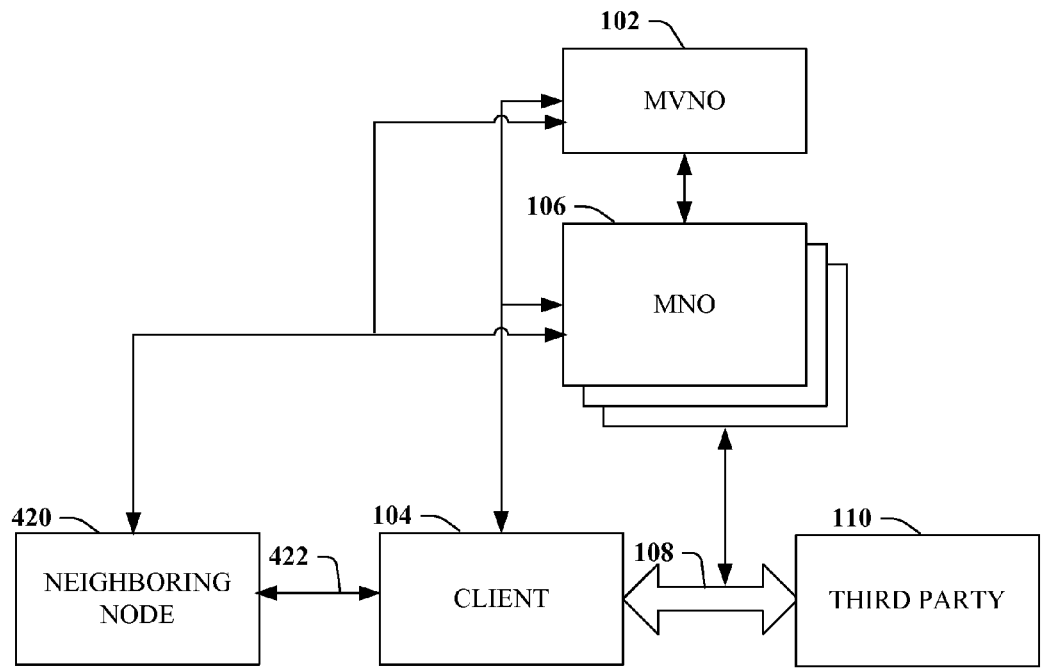
FIG. 4B illustrates a block diagram of an exemplary communication system that can enable a client to set up a communication session with assistance from a neighboring node.

In another aspect, depicted in FIG. 4B, a scenario opposite of FIG. 4A may occur where the client 104 is the recipient of access enabling information 422 from a neighboring node 420, wherein access enabling information 422 allows client 104 to establish communication session 108 with third party 110. In this case, neighboring node 420 is able to access MVNO 102 and establish communication sessions with MNO 106, whereas client 104 does not initially have such capabilities. In such an aspect, for example, the client 104, in effect, may purchase a communication session 108 from a neighboring node 420 whereby the neighboring node 420 provides access enabling information 422 (similar to access enabling information 412 of FIG. 4A) to the client 104 to enable access to a hosting MNO 106 and establishment of communication session 108 with the third party 110.

In another aspect of FIGS. 4A and 4B, rather than purchasing the information, the neighboring node 410 (FIG. 4A) or the client 104 (FIG. 4B) may instead borrow the respective access enabling information 412 or 422 to facilitate establishment of communication session 108 with MNO 106 to communicate with third party 110.

Additionally, it should be noted that access enabling information 412, 422 may include but is not limited to temporary credentials generated through connectivity software, a temporary International Mobile Subscriber Identity (IMSI), MVNO server information, WWAN protocol information, available network information, or additional software. In operation, communication between the neighboring node 410, 420 and client 104 may occur over a wireless communication link between the two nodes, a point-to-point link, or the like.

Figure 5:
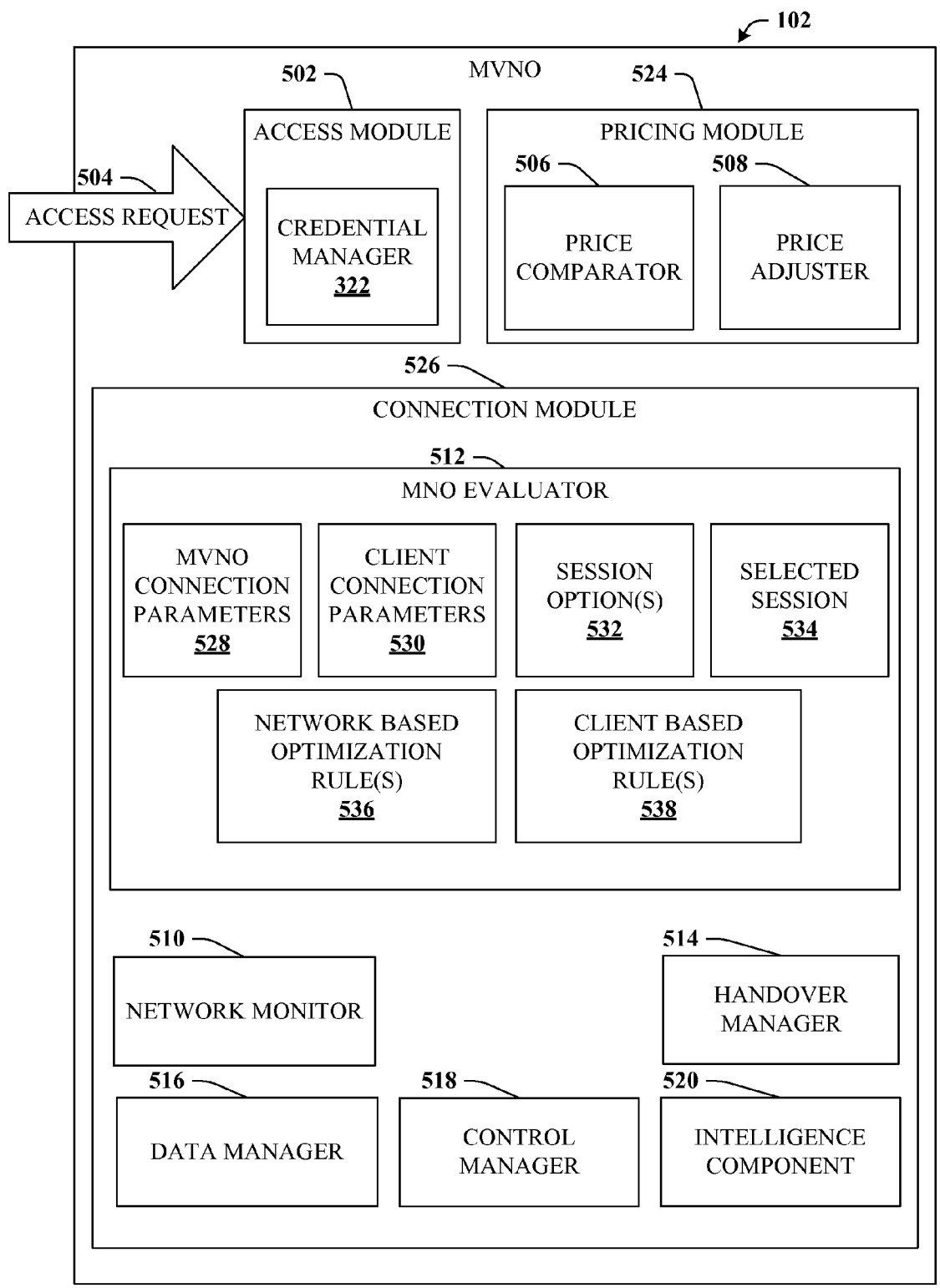
FIG. 5 is a block diagram example architecture of an MVNO.

While still referencing FIG. 1, but turning also to FIG. 5, an example architecture of MVNO 102 is illustrated. It is to be appreciated that MVNO 102 can include all or a portion of the subcomponents described herein, as well as other suitable components, modules, or devices to facilitate wireless communication in accordance with the claimed subject matter. In general, MVNO 102 can include access module 502, pricing module 524 and connection module 526. Access module 502 can include credential manager 522 and can receive access request 504.

Access request 504 can be associated with a client such as client 104, and may include client credentials, client preferences, and client-connection parameters 530. Access request 504 may be transmitted from client 104 to MVNO 102, via an available MNO 106, when client 104 attempts to establish a communication session such as communication session 108 (FIG. 1). Client credentials may be information, such as an IMEI, a phone number, a token, etc., that identify a client or an allowed service for the client. Client preferences may include but are not limited to threshold values such as a quality of service threshold, a desired throughput threshold, and the like. Furthermore, client-connection parameters 530, which as discussed below, may be utilized by MNO evaluator 512, may be associated with the set of MNOs and can include, but are not limited to, one or more of: network availability for at least one network associated with the set of MNOs, an estimation of link utilization based on local load level at the client, a desired quality of service threshold selected by the client or a user of the client, and a link quality for a possible communication session over at least one network associated with the set of MNOs.

It should be appreciated that because MNO 106 provides the infrastructure to host communication session 108, MNO 106 can be the initial recipient of access request 504 from client 104. MNO 106 can then forward access request 504 to MVNO 102. Thus, access module 502 can receive access request 504 from an MNO rather than directly from a client.

Credential manager 502 can authenticate or reject the client 104, based on client credentials that may accompany access request 504, for communication session 108 and may transmit a response to MNO 106 to forward to client 104.

Pricing module 524 can also include price comparator 506 and price adjuster 508. Price comparator 506 can collect various pricing information associated with network utilization and/or a communication session. In accordance therewith, in some aspects, price comparator 506 can transmit to client 104 pricing information associated with at least one MNO from the set of available MNOs. Based upon this information provided by price comparator 506, client 104 can choose an MNO to use for a communication session and MNO evaluator 512 then employ information from client 104 to select the most suitable or appropriate MNO.

In one aspect, connection module 526 may include network monitor 510, MNO evaluator 512, handover module 514 data manager 516, control manager 518 and intelligence component 520. Connection module 526 is operable to manage the details in setting up and/or maintaining and/or handing off and/or terminating the communication session 108.

Network monitor 510 can monitor one or more networks associated with a set of available MNOs 106. In addition, network monitor 510 can monitor individual communication sessions 108. More particularly, network monitor 510 can determine a system load associated with a hosting MNO. Moreover, network monitor 510 can determine a link quality associated with communication session 108 for client 104. Furthermore, in some aspects, network monitor 510 can examine and/or monitor, potentially on an ongoing basis, spectrum utilization for at least one MNO 106 from the set. In some aspects, networks for various MNOs can be statistically multiplexed, results of which can be employed for optimally allocating available spectrum. Based upon data received, determined, or inferred by network monitor 510, as well as other suitable information, additional features can be provided by price adjustor 508, handover manager 514 and MNO evaluator 512.

For example, price adjustor 508 can utilize the information determined by network monitor 510 for determining pricing of communication session 108. For instance, if network monitor 510 determines the link quality for communication session 108 is poor or that the load for the network operated by MNO 106 is above a predetermined threshold, then pricing for the communication session 108 can be reduced, comparatively speaking to if the link quality is better and/or the system load is not above the predetermined threshold.

Handover manager 514 can facilitate switching client 104 to a second MNO during the communication session when the system reaches a predetermined threshold, such as with respect to load or link quality (e.g., as determined by network monitor 510). It should be appreciated that in some aspects MVNO 102 can initiate the switch to the second MNO. Additionally or alternatively, the original hosting MNO can transmit a request to MVNO 102 to make the switch. In either case, handover manager 514 can be adapted to utilize information provided by network monitor 510 in order to switch client 104 to another MNO. In addition, handover manager 514 can also manage handover events that do not relate to link quality or system load. For example, handover manager 514 can facilitate a switch from one carrier to another or from one access point to another access point within a single carrier's network, e.g., when client 104 changes location.

MNO evaluator 512 can define at least one option 532 for use in choosing a communication session over a network associated with at least one MNO, or can determine a selected communication session/MNO 534, such as the optimal, best, or preferred MNO for hosting a communication session, based on the defined option(s) 532. In one aspect, the at least one option 532 may include a profile of parameters such as price, throughput, quality of service, load, etc., for one or more potential communication sessions available from one or more MNOs. Further, MNO evaluator 512 may include one or both of network-based optimization rules 536 and client-based optimization rules 538, each of which may guide the definition of option (s) 532 and/or the selected communication session/MNO 536 to achieve a desired result, e.g. a network-based end value, such as minimizing the use of network resources, balancing network load, etc., or a client-based end value, such as reducing energy/battery consumption, providing a desired service quality, or providing a desired price, etc. For example, option(s) 532 and/or selected communication session/MNO 534 may be based at least in part upon information obtained by network monitor 510, such as MVNO connection parameters 528, or based at least in part on client-connection parameters 530, or based at least in part on a combination of both MVNO connection parameters 528 and client-connection parameters 530.

For instance, MNO evaluator 512 can select the MNO in order to optimally allocate available spectrum based upon the statistical multiplexing described supra. In addition, MNO evaluator 512 can select the MNO based upon system load, link quality, or a price. It should be appreciated that in some cases, client 104 may not be able to utilize all MNOs in a given region and/or all MNOs from the set of MNOs available to MVNO 102. Thus, MNO evaluator 512 can select the suitable MNO based upon a limited subset of MNOs that are available to client 104. Further detailed, infra, in connection with price comparator 506, client 104 can choose the MNO to employ for the communication session or provide input for the selection. In one embodiment, MNO evaluator 512 can reduce or narrow the set of MNO's from which client 104 can choose for hosting the MNO and/or exclude MNO's from a list of MNO's provided to client 104 for selection.

In one aspect, potentially based at least in part upon information obtained by network monitor 510, MNO evaluator 512 may include MVNO connection parameter data 528. This data may be retrieved by the MVNO from available MNOs. For example, the connection parameter data retrieved by the MVNO may include, but is not limited to, one or more of: network availability for at least one network associated with the set of MNOs, an estimation of link utilization based on load level in at least one of the set of MNOs, a system load for at least one network associated with the set of MNOs, and pricing options associated with the set of MNOs.

By way of example, and not limitation, link utilization can refer to a load or level of utilization over a wireless channel being used for a communication session. In operation, a wireless backhaul associated with the network infrastructure of an MNO may aggregate link utilization from multiple basestations in a geographic area. Nodes higher up in the network infrastructure may aggregate traffic from different geographic areas. A performance bottleneck could be encountered and detected in the MNO at any level in the network infrastructure. By contrast, system load may refer to the overall network load the in the network infrastructure of an MNO.

In operation, the MVNO may obtain information from different MNO regarding their respective load-levels at different levels in their respective infrastructures. In one aspect, there may be thresholds associated with these load-levels where pricing may increase, or where the service may be denied if the load exceeds a threshold. The thresholds may be different for different MNOs depending at least in part on their respective capacities. Furthermore, The thresholds may be different at different levels in their respective network infrastructures. In one aspect, an MNO may have different system load metrics to be monitored at different levels in its network infrastructure. The MVNO may have visibility into one or more such metrics, that it may then use to determine whether to take a specific action based on such a system load.

Alternatively, or in addition, in another aspect, MNO evaluator 512 may include one or more client-connection parameters 530, which may also be utilized in determining the selection of the MNO to use for the communication session 108 (FIG. 1). As noted above, client-connection parameters 530 may be provided by client 104 (FIG. 1), such as in access request 504.

In one example, which should not be construed as limiting, consider the case in which the MVNO has access to 6 networks. Of these 6 networks, the client can utilize any of the first 3 networks, wherein network 1 is provided by MNO A, networks 3 and 3 are provided by MNO B, and network 4 is provided by MNO C. Further suppose that network 4 (e.g., MNO C) has a very degraded link quality, whereas link quality for network 1 (e.g., MNO A) is substantially optimal, and where link quality for networks 3 and 3 (e.g., MNO B) are relatively average, but good enough for the needs of the client. Based upon these constraints, the MVNO can exclude MNO C, e.g., due to the poor link quality over network 4 of MNO C. The MVNO can further look up costs associated with hosting the communication session over networks provided by MNOs A and B in the region where the client is located. Assuming that MNO B (e.g., provider of networks 3 and 3) is more modestly priced, then the MVNO can exclude or omit MNO A or, alternatively, maintain MNO A in a list of choices provided to the client, but recommend MNO B even though allowing the option for the client to choose MNO A. Since MNO B has two different networks, networks 3 and 3, one of these can be highlighted (or excluded) over the other as well. For instance, if network 3 has better link quality, can support higher bandwidth, has a lower system load, or the like, then network 3 can be suggested or recommended to the client.

In addition, control manager 518 can receive and manage control information for a communication session. Typically, this control information will be forwarded to MVNO 102 from the hosting MNO 106. Further, MVNO 102 can include data flow manager 516 that can receive and manager data for the communication session 108. Thus, it should be appreciated that in some embodiments, MVNO 102 can manage control and data flow for communication session 108, whereas in other embodiments, the MNO can manage data flow for communication session 108.

Additionally, intelligence component 520 can employ machine learning techniques and/or employ Bayesian-based probability thresholds for various features described herein and/or to provide for or aid in various inferences or determinations described herein. Intelligence component 520 can be included in one or more components of MVNO 102 or be a separate component as depicted.

Accordingly, in order to provide for or aid in the numerous inferences described herein, intelligence component 520 can examine the entirety or a subset of the data available and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier can be a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 6:
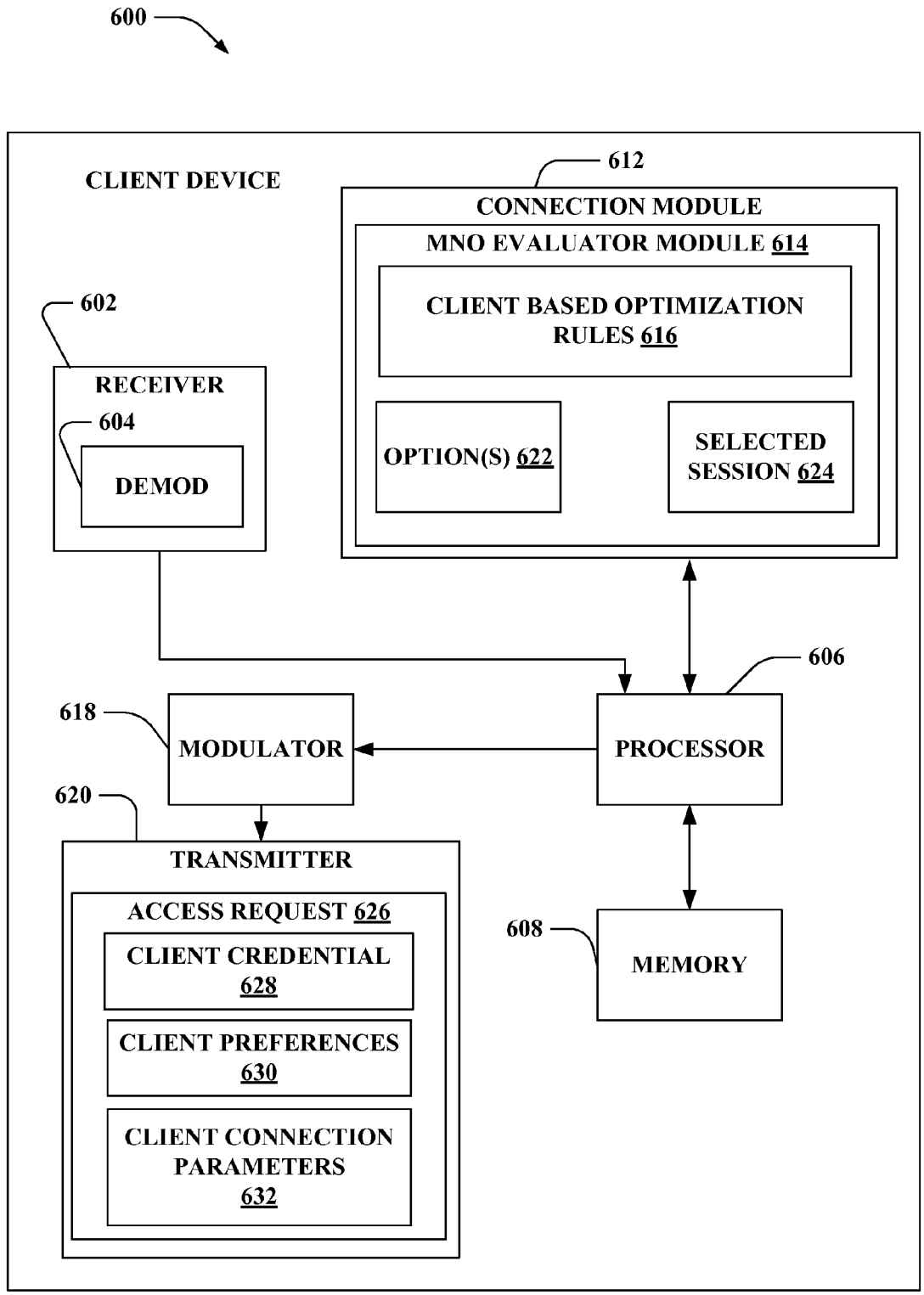
FIG. 6 is a block diagram example architecture of a Client.

With reference now to FIG. 6, an illustration of a client device 600 that facilitates MVNO access for a client is presented. Client device 600 comprises a receiver 602 that receives a signal from, for instance, a receive antenna (not shown), performs typical actions on (e.g., filters, amplifies, downconverts, etc.) the received signal, and digitizes the conditioned signal to obtain samples. Receiver 602 can comprise a demodulator 604 that can demodulate received symbols and provide them to a processor 606 for channel estimation. Processor 606 can be a processor dedicated to analyzing information received by receiver 602 and/or generating information for transmission by a transmitter 620, a processor that controls one or more components of client device 600, and/or a processor that both analyzes information received by receiver 602, generates information for transmission by transmitter 620, and controls one or more components of client device 600.

Furthermore, transmitter 620 may transmit, among other data or the like, access request 626. Access request 626 may include client credentials 628, client preferences 630, and client-connection parameters 632. Access request 624 may be transmitted when client 600 attempts to establish a communication session such as communication session 108. Client preferences 630 may include but are not limited to threshold values such as a quality of service threshold, a desired throughput threshold, and the like. Furthermore, client-connection parameters 632, which as discussed below may be utilized by MNO evaluator 614, may be associated with the set of MNOs and can include, but are not limited to, one or more of: network availability for at least one network associated with the set of MNOs, an estimation of link utilization based on local load level at the client, a desired quality of service threshold selected by the client or a user of the client, and a link quality for a possible communication session over at least one network associated with the set of MNOs.

Client device 600 can additionally comprise memory 608 that is operatively coupled to processor 606 and that can store data to be transmitted, received data, information related to available channels, data associated with analyzed signal and/or interference strength, information related to an assigned channel, power, rate, or the like, and any other suitable information for estimating a channel and communicating via the channel. Memory 608 can additionally store protocols and/or algorithms associated with estimating and/or utilizing a channel (e.g., performance based, capacity based, etc.).

It will be appreciated that the data store (e.g., memory 608) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 608 of the subject systems and methods is intended to comprise, without being limited to, these and any other suitable types of memory.

Client device 600 can further comprise a connection module 612 to facilitate MVNO access for the client device. Connection module 612 may further comprise MNO Evaluator module 614 to assist in establishing a communication session. MNO evaluator 614 may include client-based optimization rules 616 which may guide the definition of option(s) 622 and/or the selected communication session/MNO 624 to achieve a desired result, e.g. a network-based end value, such as minimizing the use of network resources, balancing network load, etc., or a client-based end value, such as reducing energy/battery consumption, providing a desired service quality, or providing a desired price, etc. For example, option(s) 622 and/or selected communication session/MNO 624 may be based at least in part on client-connection parameters 624.

Figure 7:
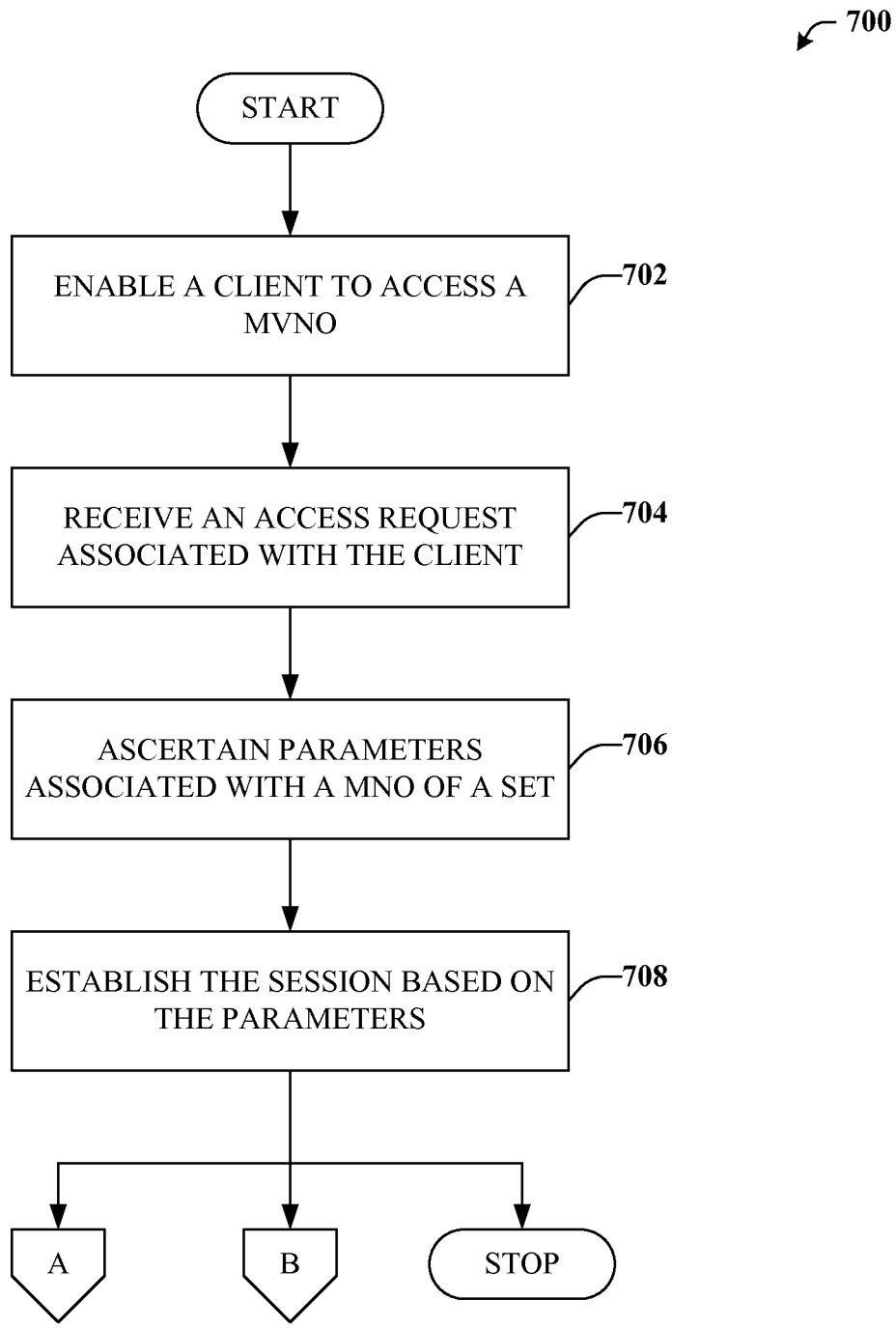
FIG. 7 depicts an exemplary method for establishing a communication session through a MVNO and pricing for utilization.
Figure 8:
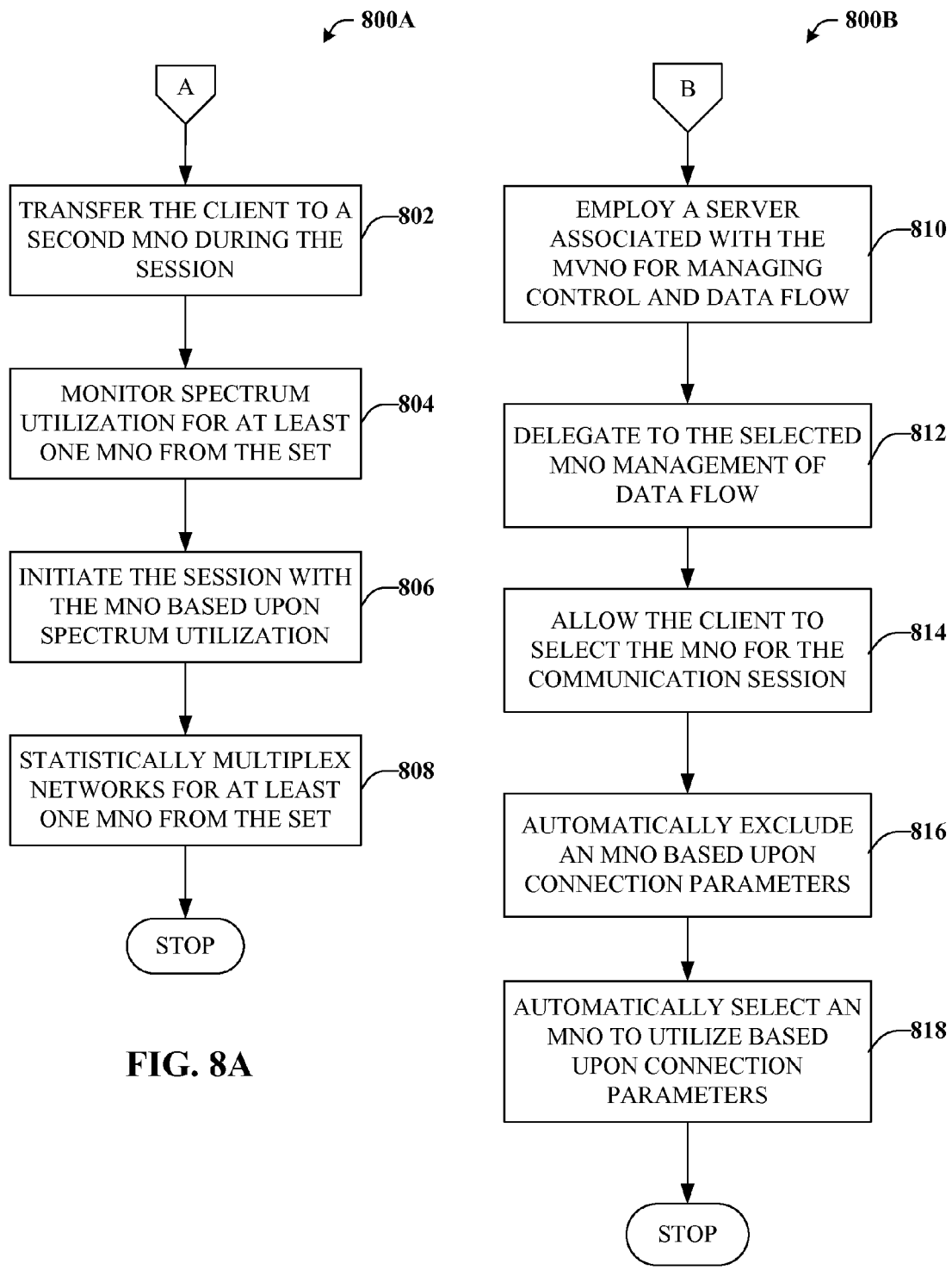
FIG. 8A is an exemplary method for providing additional features in connection with host network features.
FIG. 8B is an exemplary method for providing additional features in connection with task allocation or assignment.

FIGS. 7, 8A, and 8B illustrate various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning now to FIG. 7, exemplary method 700 for providing MVNO access and pricing for utilization is illustrated. Generally, at reference numeral 702, client access to a MVNO can be enabled. Typically, the MVNO employs a host MNO from a set of available MNOs for hosting a communication session associated with the client. At reference numeral 704, a client credential associated with the client can be received from at least one MNO from the set of available MNOs.

Next to be described, at reference numeral 706, connection parameters associated with at least one of the set of MNOs can be ascertained. In one aspect, these parameters may be retrieved by the client and transmitted with an access request. In another aspect, these parameters may be determined by the MVNO. In still another aspect, these parameters may be retrieved from the client and the MVNO. At reference numeral 708, a communication session is established. In one aspect, the client selects from possible available communication sessions, for example, based on the gathered parameters and other information, such as one or more of client or MNO or MVNO optimization rules, available to the MVNO and provided to the client regarding available connections. While in another aspect, the MVNO selects the communication session for the client, for example, based on the gathered parameters and applied rules. In one aspect, a price for the communication session can also be calculated based at least in part on the determined parameters, such as but not limited to, the system load or the link quality. Thus, for example, the price may be relatively higher if the link quality is highly rated. Furthermore, the system load can also affect the price of the communication session.

Referring to FIG. 8A, exemplary method 800A for providing additional features in connection with hosting MNO and associated network or networks is illustrated. In general, at reference numeral 802, the client can be transferred to a second MNO during the communication session based upon parameters, such as but not limited to, the system load or the link quality, as described above. Hence, while the system load and link quality can be employed as a basis for setting a price for the communication session, these indicators can also be utilized for transferring client in order to, inter alia, deliver better service to the client.

At reference numeral 804, spectrum utilization for at least one MNO from the set of available MNOs can be monitored. Thus, at reference numeral 806, the communication session that employs the hosting MNO can be initiated based upon the spectrum utilization. For example, the hosting MNO can be selected based upon the spectrum utilization. In some situations the hosting MNO can be selected to optimize spectrum utilization amongst all or a subset of available MNOs, whereas in other situations, the hosting MNO can be selected so as not to add to a particular MNO that current has a high utilization. At reference numeral 808, a network for at least one MNO from the set of available MNOs can be statistically multiplexed. By statistically multiplexing one or more networks for associated MNOs, the MNO selection based upon spectrum utilization detailed supra in connection with reference numeral 806 can be further optimized.

Referring to FIG. 8B, exemplary method 800B for providing additional features in connection with task allocation or assignment is illustrated. Typically, at reference numeral 810, a server associated with the MVNO can be employed for managing control information and data flow for the communication session. Appreciably the server can be operated or managed by or include certain components associated with the MVNO such as, e.g., a control manager and/or data manager.

At reference numeral 812, management of data flow for the communication session can be delegated to the host MNO. Appreciably, while data flow can be delegated to the host MNO, the MVNO can still receive and manage control information. At reference numeral 814, the client can be allowed to select the hosting MNO for the communication session. It should be understood that a list of suitable and/or available MNOs can be supplied to the client as well as various pricing information and even potentially network characteristics such as system load, link quality, and so forth. Furthermore, at reference numeral 816, the MVNO can automatically exclude any omitted MNO from a list of available MNOs to employ for the communication session based upon connection parameters such as, the system load, the link quality, pricing, etc., and resource optimization parameters such as client power usage, connection cost, network resource usage, etc. At reference numeral 818, the host MNO can be selected automatically based at least in part upon the above mentioned connection parameters and resource optimization parameters.

Figure 9:
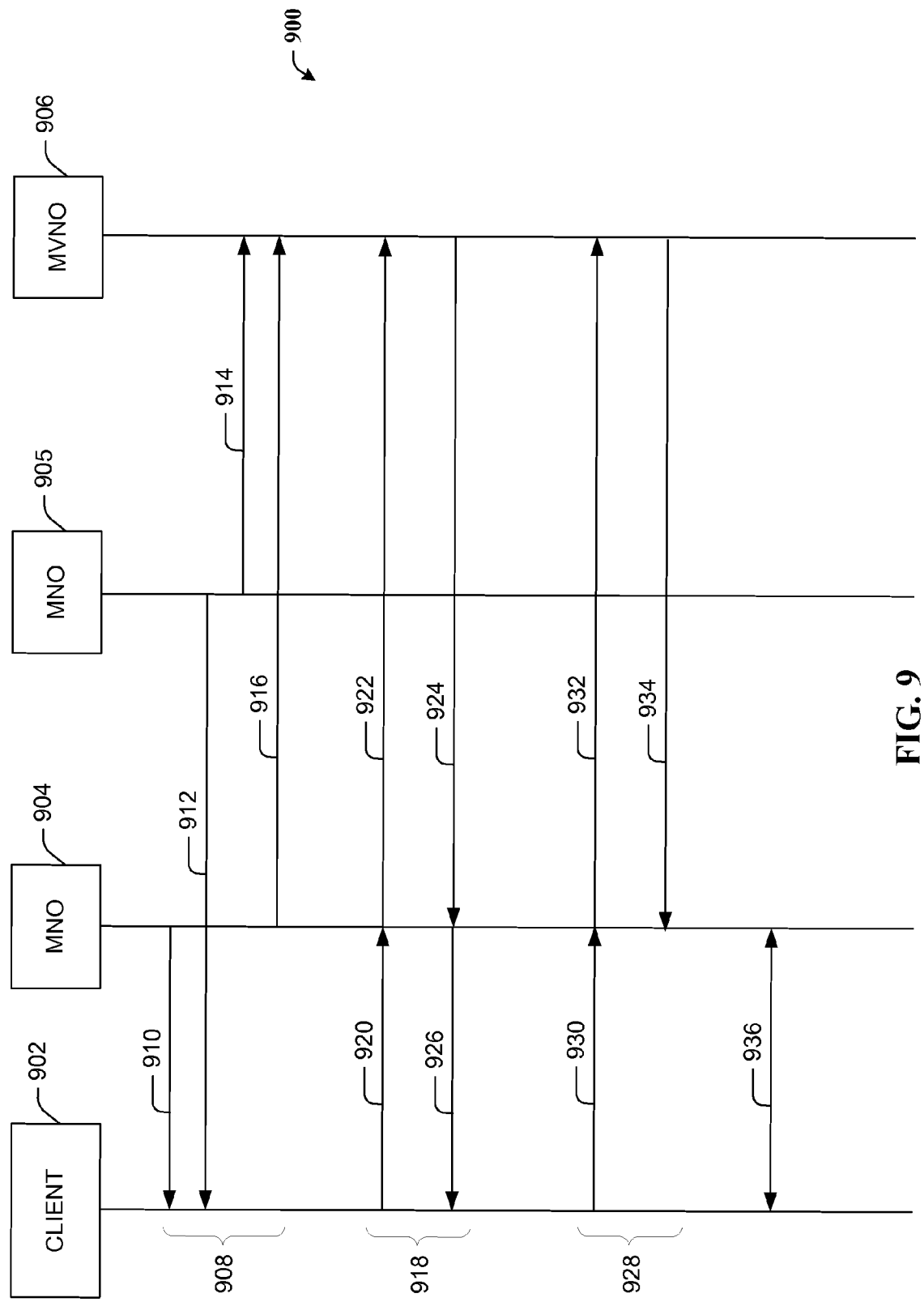
FIG. 9 is a call flow diagram of an aspect of a call flow of the system of FIG. 1.

Referring to FIG. 9, in one non-limiting aspect, a call flow 900 details interactions between various components of a communication system that can provide client access to an MVNO, such as system 100 (FIG. 1). In this example, client 902 may be able to communicate with one or more MNOs, such as MNO 904 and MNO 905, which are potential mobile network operators with through whom client 902 may wish to establish a communication session. It should be noted that although not shown, additional MNOs may be available for direct communication with client 902. Furthermore, for sake of illustrating call flow 900, the call flow may be sub-divided into three activities; connection parameter gathering 908, connection initiation 918, and connection authentication 928.

In one aspect, during connection parameter gathering 908, at acts 910 and 912, client 902 obtains connection parameter data from MNO 904 and MNO 905. For example, the connection parameter data obtained by the client may include one or more of: network availability for at least one network associated with the set of MNOs, an estimation of link utilization based on local load level at the client, a desired quality of service threshold selected by the client, and a link quality for a possible communication session. Additionally, during parameter gathering 908, at acts 914 and 916, MVNO 906 obtains connection parameter data from MNO 904 and MNO 905. For example, the connection parameter data obtained by the MVNO may include one or more of: network availability for at least one network associated with the set of MNOs, an estimation of link utilization based on load level at the MVNO, a system load for at least one network associated with the set of MNOs, and pricing options associated with the set of MNOs.

Additionally, it should be noted that MVNO 906 may be a heterogeneous MVNO in communication with a plurality of MNOs, such as MNO 904 and MNO 905, representing a plurality of carriers, a plurality of network technologies, and a plurality of communication protocols.

In one aspect, during connection initiation 918, at act 920, client 902 may transmit an access request for the MVNO to a MNO acting as a host MNO for the MVNO. The access request may include, but is not limited to: client-connection parameters, including client preferences. For example, client preferences may include a quality of service threshold, a desired throughput threshold, and the like. At act 922, the access request may be relayed from the hosting MNO (in this case 904) to the MVNO 906. Communication session access information is related back to the client 902 through the hosting MNO at acts 924 and 926. In one aspect, the access information provides a client with various communication session connection options and allows the client to select a communication session/MNO based on these options. For example, these options may present parameters such as price, throughput, quality of service, load, etc., for one or more potential communication sessions available from one or more MNOs. In another aspect the MVNO automatically selects the communication session for the client, e.g. based on client-based rules, network-based rules, or both, and relays the choice and the corresponding session setup information to the client through the access information. In such an aspect, the MVNO may make the selection based at least in part on the client-retrieved and/or network-retrieved connection parameters. In another aspect, the MVNO may also attempt to optimize resources for the client and/or a network by substantially minimizing factors such as, but not limited to: power usage, service quality and cost for the client, and network load, strength, and price for the MVNO.

In one aspect, during connection authentication 928, client 902 may transmit client credentials to MVNO 906 through the hosting MNO at acts 930 and 932. Alternatively, the client credentials may be grouped with the access request transmitted to the MVNO at acts 920 and 922. At act 934, once MVNO 906 authenticated the client credentials then the MVNO transmits to the selected MNO 904 connection data for the authenticated client 902. Thereafter, at act 936, client 902 may use the selected communication session established through MNO 904.

As noted above, once the communication session has been established, the role of the MVNO may become de minimis as the client interacts with the third party directly through the communication session established via the MNO. In one aspect, control information can be passed to the MVNO for session initiation, and subsequently all data flow can then traverse directly from the carrier's network to the third party, e.g., an Internet site or a called party, without any need to propagate to the MVNO. In another aspect, all or a portion of control and data flow can be managed by tunneling to a server managed by the MVNO. For example, handoffs can be managed by the MVNO server. Such handoffs can operate across two different MNO carriers, and/or operate within a single MNO network such as when changing base stations or access points within a single carrier.

Figure 10:
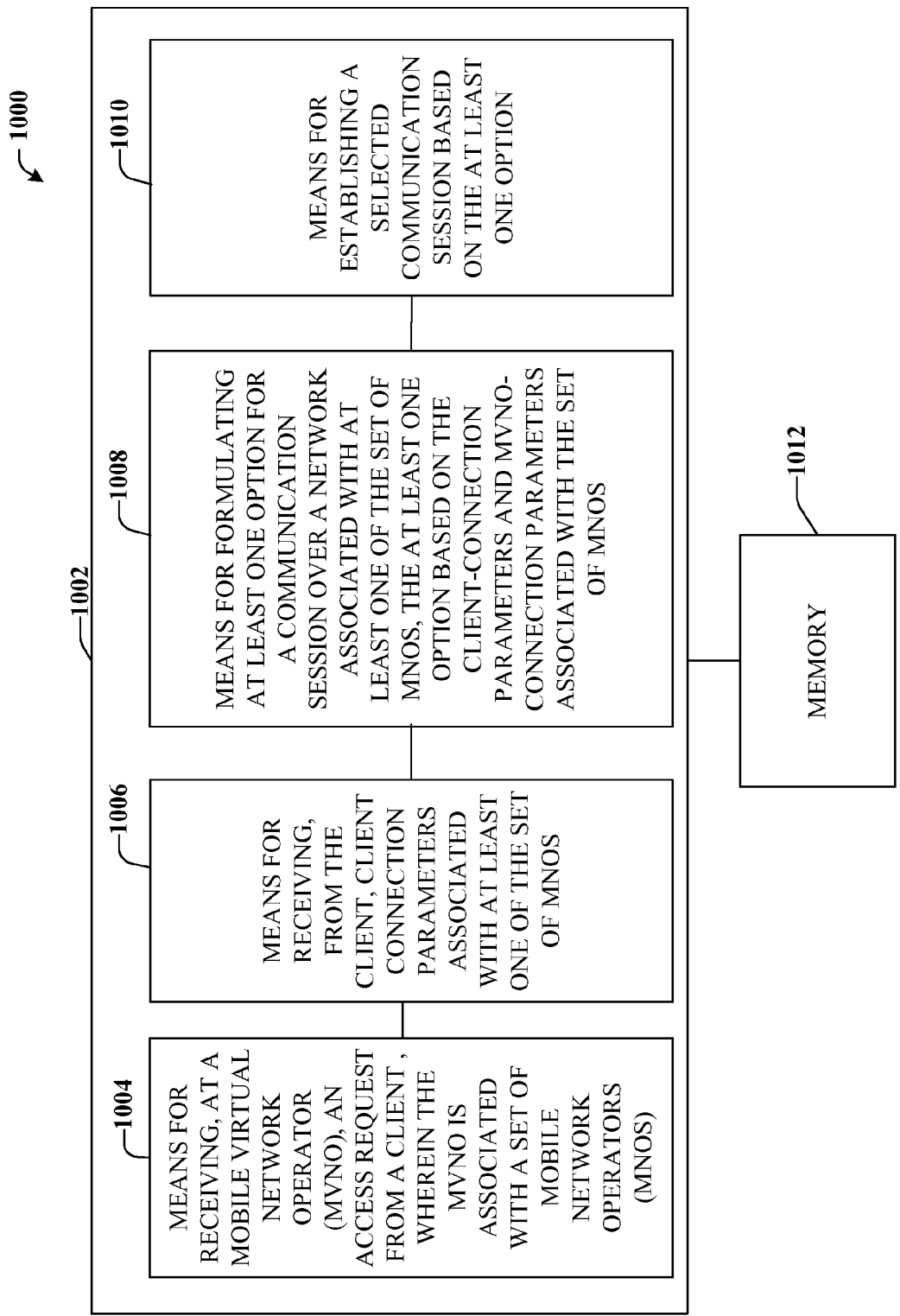
FIG. 10 depicts a block diagram of an exemplary communication system that can facilitate operations in connection with establishing a communication session through a MVNO.

With reference to FIG. 10, illustrated is a system 1000 that facilitates mobile virtual network operator access for a client. For example, system 1000 can reside at least partially within a base station, mobile device, etc. According to another example aspect, system 1000 can reside at least partially within an access terminal. It is to be appreciated that system 1000 is represented as including functional blocks, which can be functional blocks that represent functions implemented by a processor, software, or combination thereof (e.g., firmware).

System 1000 includes a logical grouping 1002 of means that can act in conjunction. For instance, logical grouping 1002 can include means for means for receiving, at a mobile virtual network operator (MVNO), an access request from a client, wherein the MVNO is associated with a set of mobile network operators (MNOs) 1004. For example, the access request, as described, can include client instructions for selecting a MNO, client credentials, etc. From client credentials associated with the access request, access to at least one MNO from the set of available MNOs can be inferred. Further, logical grouping 1002 can include means for receiving, from the client, client connection parameters associated with at least one of the set of MNOs 1006. Additionally, as described, the client connection parameters associated with the set of MNOs can include, but are not limited to: network availability for at least one network associated with the set of MNOs, an estimation of link utilization based on local load level at the client, a desired quality of service threshold selected by the client, and a link quality for a possible communication session over at least one network associated with the set of MNOs.

Further, logical grouping 1002 can comprise means for formulating at least one option for a communication session over a network associated with at least one of the set of MNOs, the at least one option based on the client-connection parameters and MVNO-connection parameters associated with the set of MNOs 1008. MVNO-connection parameters associated with the set of MNOs can include, but are not limited to: network availability for at least one network associated with the set of MNOs, an estimation of link utilization based on load level at the MVNO, a system load for at least one network associated with the set of MNOs, and pricing options associated with the set of MNOs.

Additionally, logical grouping 1002 can comprise means for establishing a selected communication session based on the at least one option 1010. For example, the communication session selection may be received through a client selection after the client has been prompted with respect to various communication session options. In another example, the communication session selection may be received from the MVNO after the MVNO has taken into consideration the various connection parameters. Furthermore, the communication session selection may be incorporate factors to substantially minimize resource usage on both the client side and the network side. As such, client power usage, service quality and session pricing may factor into the selection. Furthermore, network load, use, and price may factor into the selection. Additionally, for example, a communication session may be established over a network once the client is authenticated and connection data and instructions are communication between the client and a third party with which the communication session is being held.

Based at least in part on this information, options for possible communication sessions can be inferred. Additionally, system 1000 can include a memory 1012 that retains instructions for executing functions associated with the means 1004, 1006, 1008 and 1010. While shown as being external to memory 1012, it is to be understood that one or more of the means 1004, 1006, 1008 and 1010 can exist within memory 1012.

Figure 11:
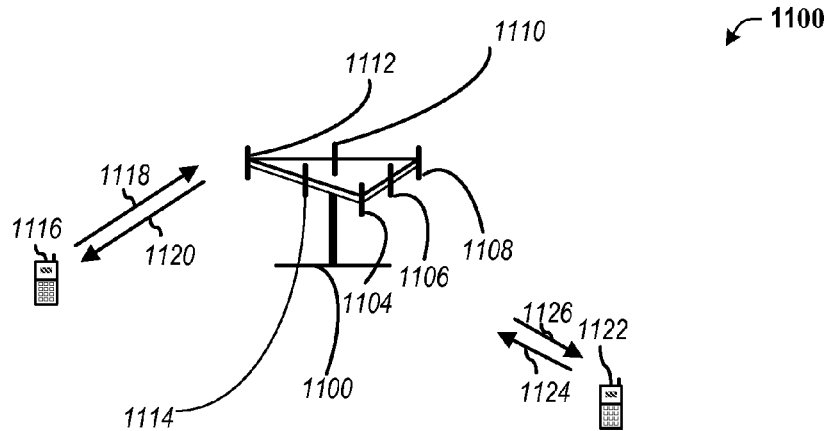
FIG. 11 illustrates an exemplary multiple access wireless communication system according to an aspect.

Referring to FIG. 11, a multiple access wireless communication system according to one aspect is illustrated. An access point 1100 (AP) includes multiple antenna groups, one including 1104 and 1106, another including 1108 and 1110, and an additional including 1112 and 1114. In FIG. 11, only two antennas are shown for each antenna group, however, more or fewer antennas may be utilized for each antenna group. Access terminal 1116 (AT) is in communication with antennas 1112 and 1114, where antennas 1112 and 1114 transmit information to access terminal 1116 over forward link 1120 and receive information from access terminal 1116 over reverse link 1118. Access terminal 1122 is in communication with antennas 1106 and 1108, where antennas 1106 and 1108 transmit information to access terminal 1122 over forward link 1126 and receive information from access terminal 1122 over reverse link 1124. In a FDD system, communication links 1118, 1120, 1124 and 1126 may use different frequency for communication. For example, forward link 1120 may use a different frequency then that used by reverse link 1118.

Each group of antennas and/or the area in which they are designed to communicate is often referred to as a sector of the access point. In the aspect, antenna groups each are designed to communicate to access terminals in a sector, of the areas covered by access point 1100.

In communication over forward links 1120 and 1126, the transmitting antennas of access point 1100 utilize beamforming in order to improve the signal-to-noise ratio of forward links for the different access terminals 1116 and 1124. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 12:
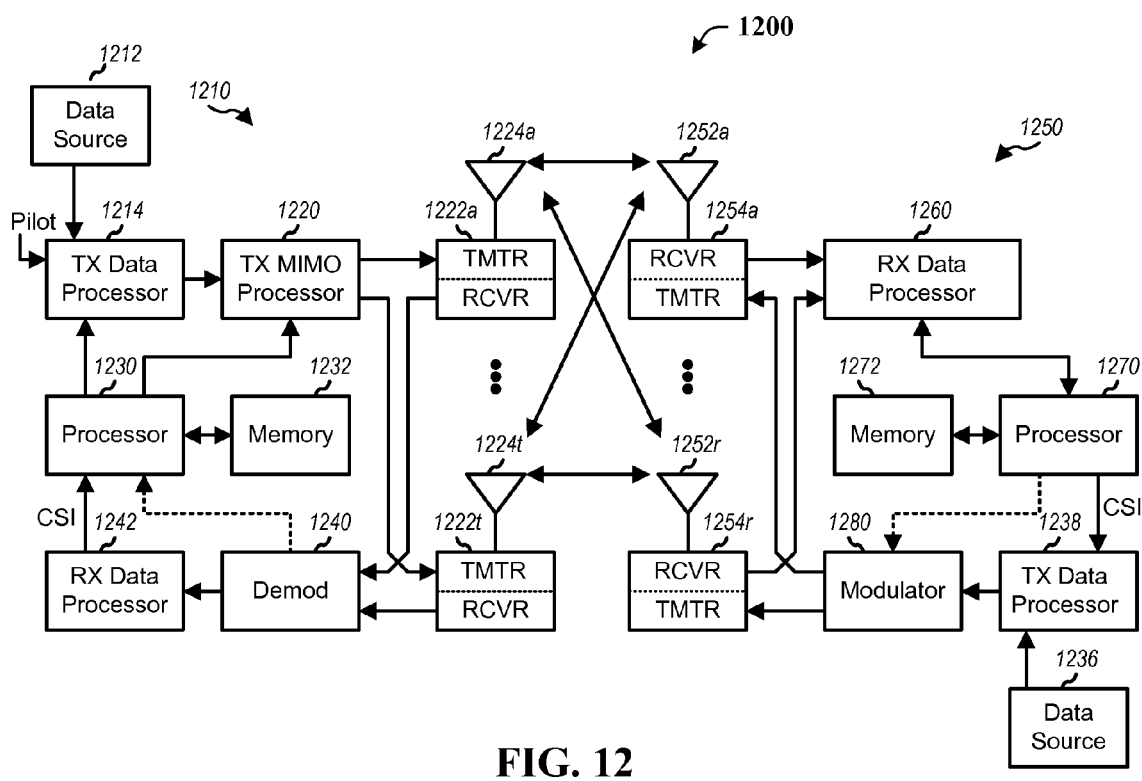
FIG. 12 depicts a block diagram of an exemplary communication system.

Referring to FIG. 12, a block diagram of an aspect of a transmitter system 1210 (also known as the access point) and a receiver system 1250 (also known as access terminal) in a MIMO system 1200 is illustrated. At the transmitter system 1210, traffic data for a number of data streams is provided from a data source 1212 to a transmit (TX) data processor 1214.

In an aspect, each data stream is transmitted over a respective transmit antenna. TX data processor 1214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 1230.

The modulation symbols for all data streams are then provided to a TX MIMO processor 1220, which may further process the modulation symbols (e.g., for OFDM). TX MIMO processor 1220 then provides $N_T$ modulation symbol streams to $N_T$ transmitters (TMTR) 1222a through 1222t. In certain aspects, TX MIMO processor 1220 applies beamforming weights to the symbols of the data streams and to the antenna from which the symbol is being transmitted.

Each transmitter 1222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 1222a through 1222t are then transmitted from $N_T$ antennas 1224a through 1224t, respectively.

At receiver system 1250, the transmitted modulated signals are received by $N_R$ antennas 1252a through 1252r and the received signal from each antenna 1252 is provided to a respective receiver (RCVR) 1254a through 1254r. Each receiver 1254 conditions (e.g., filters, amplifies, and downconverts) a respective received signal, digitizes the conditioned signal to provide samples, and further processes the samples to provide a corresponding "received" symbol stream.

An RX data processor 1260 then receives and processes the $N_R$ received symbol streams from $N_R$ receivers 1254 based on a particular receiver processing technique to provide $N_T$ "detected" symbol streams. The RX data processor 1260 then demodulates, deinterleaves, and decodes each detected symbol stream to recover the traffic data for the data stream. The processing by RX data processor 1260 is complementary to that performed by TX MIMO processor 1220 and TX data processor 1214 at transmitter system 1210.

A processor 1270 periodically determines which pre-coding matrix to use (discussed below). Processor 1270 formulates a reverse link message comprising a matrix index portion and a rank value portion.

The reverse link message may comprise various types of information regarding the communication link and/or the received data stream. The reverse link message is then processed by a TX data processor 1238, which also receives traffic data for a number of data streams from a data source 1236, modulated by a modulator 1280, conditioned by transmitters 1254a through 1254r, and transmitted back to transmitter system 1210.

At transmitter system 1210, the modulated signals from receiver system 1250 are received by antennas 1224, conditioned by receivers 1222, demodulated by a demodulator 1240, and processed by a RX data processor 1242 to extract the reserve link message transmitted by the receiver system 1250. Processor 1230 then determines which pre-coding matrix to use for determining the beamforming weights then processes the extracted message.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In an aspect, Logical Traffic Channels comprises a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), a Uplink Shared Data Channel (UL-SDCH) and plurality of PHY channels. The PHY channels comprise a set of DL channels and UL channels.

The DL PHY channels may comprise:
  Common Pilot Channel (CPICH)
  Synchronization Channel (SCH)
  Common Control Channel (CCCH)
  Shared DL Control Channel (SDCCH)
  Multicast Control Channel (MCCH)
  Shared UL Assignment Channel (SUACH)
  Acknowledgement Channel (ACKCH)
  DL Physical Shared Data Channel (DL-PSDCH)
  UL Power Control Channel (UPCCH)
  Paging Indicator Channel (PICH)
  Load Indicator Channel (LICH)

The UL PHY Channels comprises:
  Physical Random Access Channel (PRACH)
  Channel Quality Indicator Channel (CQICH)
  Acknowledgement Channel (ACKCH)
  Antenna Subset Indicator Channel (ASICH)
  Shared Request Channel (SREQCH)
  UL Physical Shared Data Channel (UL-PSDCH)
  Broadband Pilot Channel (BPICH)

In an aspect, a channel structure is provided that preserves low PAR (at any given time, the channel is contiguous or uniformly spaced in frequency) properties of a single carrier waveform.

For the purposes of the present document, the following abbreviations may apply:
  AM Acknowledged Mode
  AMD Acknowledged Mode Data
  ARQ Automatic Repeat Request
  BCCH Broadcast Control Channel
  BCH Broadcast Channel
  C- Control-
  CCCH Common Control Channel
  CCH Control Channel
  CCTrCH Coded Composite Transport Channel
  CP Cyclic Prefix
  CRC Cyclic Redundancy Check
  CTCH Common Traffic Channel
  DCCH Dedicated Control Channel
  DCH Dedicated Channel
  DL DownLink
  DSCH Downlink Shared Channel
  DTCH Dedicated Traffic Channel
  FACH Forward link Access Channel
  FDD Frequency Division Duplex
  L1 Layer 1 (physical layer)
  L2 Layer 4 (data link layer)
  L3 Layer 4 (network layer)
  LI Length Indicator
  LSB Least Significant Bit
  MAC Medium Access Control
  MBMS Multimedia Broadcast Multicast Service
  MCCHMBMS point-to-multipoint Control Channel
  MRW Move Receiving Window
  MSB Most Significant Bit
  MSCH MBMS point-to-multipoint Scheduling Channel
  MTCH MBMS point-to-multipoint Traffic Channel
  PCCH Paging Control Channel
  PCH Paging CHannel
  PDU Protocol Data Unit
  PHY Physical layer
  PhyCHPhysical Channels
  RACH Random Access Channel
  RLC Radio Link Control
  RRC Radio Resource Control
  SAP Service Access Point
  SDU Service Data Unit
  SHCCH Shared channel Control Channel
  SN Sequence Number
  SUFI Super Field
  TCH Traffic Channel
  TDD Time Division Duplex
  TFI Transport Format Indicator
  TM Transparent Mode
  TMD Transparent Mode Data TTI Transmission Time Interval
U- User-
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
MBSFN multicast broadcast single frequency network
MCE MBMS coordinating entity
MCH multicast channel
DL-SCH downlink shared channel
MSCH MBMS control channel
PDCCH physical downlink control channel
PDSCH physical downlink shared channel Further, for example, the present aspects may be applied to a Long Term Evolution (LTE) system, including components such as: an Evolved NodeB (E-NodeB), which has base station functionality; an Evolved UMTS Terrestrial Radio Access Network (E-UTRAN), which is the network that includes the E-NodeBs; and an Evolved Packet Core (EPC), also known as a System Architecture Evolution (SAE) core, which serves as the equivalent of GPRS networks via the Mobility Management Entity (MME), Serving Gateway (S-GW) and Packet Data Node (PDN) Gateway subcomponents.

The MME is a control-node for the LTE access-network. It is responsible for idle mode UE tracking and paging procedure including retransmissions. It is involved in the bearer activation/deactivation process and is also responsible for choosing the SGW for a UE at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to UEs. It checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 4G/3G access networks with the S3 interface terminating at the MME from the SGSN. The MME also terminates the S6a interface towards the home HSS for roaming UEs.

The SGW routes and forwards user data packets, while also acting as the mobility anchor for the user plane during inter-E-NodeB handovers and as the anchor for mobility between LTE and other 4GPP technologies (terminating S4 interface and relaying the traffic between 4G/3G systems and PDN GW). For idle state UEs, the SGW terminates the DL data path and triggers paging when DL data arrives for the UE. It manages and stores UE contexts, e.g. parameters of the IP bearer service, network internal routing information. It also performs replication of the user traffic in case of lawful interception.

The PDN GW provides connectivity to the UE to external packet data networks by being the point of exit and entry of traffic for the UE. A UE may have simultaneous connectivity with more than one PDN GW for accessing multiple PDNs. The PDN GW performs policy enforcement, packet filtering for each user, charging support, lawful Interception and packet screening. Another role of the PDN GW is to act as the anchor for mobility between 4GPP and non-3GPP technologies such as WiMAX and 4GPP2 (CDMA 1X and EvDO).

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 4GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 4" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for facilitating access to a communication session for a client, the method comprising:
    receiving, at a mobile virtual network operator (MVNO), an access request from a client, wherein the MVNO is associated with a set of mobile network operators (MNOs), wherein the access request is received via a wireless connection between the client and one of the set of MNOs;
    receiving, from the client within a client device, client connection parameters associated with at least one of the set of MNOs;
    formulating at least one option for a communication session over a network associated with at least one of the set of MNOs, the at least one option based on the client connection parameters and MVNO-connection parameters associated with the set of MNOs, wherein formulating comprises optimizing the at least one option for the communication session based on resources including link quality, connection cost, and connection strength, and wherein final optimization of the at least one option for the communication session is performed at the MVNO and at the client; and
    establishing a selected communication session including the client and a selected MNO of the set of MNOs, based on the at least one option.

2. The method of claim 1, wherein formulating at least one option for a communication session comprises formulating a plurality of options for a plurality of communication sessions, further comprising sending the plurality of options to the client, and receiving an identification of the selected communication session from the plurality of options from the client.

3. The method of claim 1, wherein formulating at least one option for a communication session comprises formulating a plurality of options for a plurality of communication sessions, further comprising selecting for the client, by the MVNO, the selected communication session from the plurality of options.

4. The method of claim 1, wherein receiving the access request further comprises:
receiving a client credential associated with the client; and
authenticating the client credential for the selected communication session.

5. The method of claim 1, wherein the client comprises a device provided with access information to access the MVNO via the one of the set of MNOs authorized to communicate with MVNO, and further comprising providing the client with a temporary identification for use in establishing the selected communication session.

6. The method of claim 1, wherein establishing the selected communication session further comprising establishing one of the set of MNOs as a host MNO for the communication session.

7. The method of claim 1, wherein the client connection parameters include at least one of:
network availability for at least one network associated with the set of MNOs; or
an estimation of link utilization based on local load level at the client; or
a desired quality of service threshold selected by the client; or
a link quality for a possible communication session over at least one network associated with the set of MNOs.

8. The method of claim 1, wherein the MVNO connection parameters include at least one of:
network availability for at least one network associated with the set of MNOs; or
an estimation of link utilization based on load level in at least one of the set of MNOs; or
the system load for at least one network associated with the set of MNOs; or
pricing options associated with the set of MNOs.

9. The method of claim 1, wherein optimizing comprises optimizing the at least one option for a communication session to minimize the resources comprising network resources and client resources, where network resources include at least one of network load, use and price, and where client resources include at least one of client energy use, service quality and price.

10. The method of claim 1, further comprising switching the client to a second MNO from the set of MNOs during the communication session when the MVNO determines that at least one of the connection parameters associated with the selected MNO reaches a predetermined threshold.

11. The method of claim 10, wherein the predetermined threshold comprises at least one of:
a network signal threshold level; or
a network load threshold level; or
a network price threshold level.

12. The method of claim 1, further comprising:
examining spectrum utilization for at least one MNO from the set of MNOs; and
dynamically assigning the communication session to one of the MNOs based on the spectrum utilization.

13. The method of claim 1, further comprising:
examining spectrum utilization for at least one MNO from the set of MNOs; and
statistically multiplexing a network for optimally allocating available spectrum, based on the spectrum utilization examination, for at least one MNO from the set of MNOs.

14. The method of claim 1 further comprising managing, by the MVNO, control and data flow for the selected communication session between the client and the selected MNO of the set of MNOs, via a data tunnel through the MVNO.

15. The method of claim 14, further comprising managing, by the MVNO, handover events for the communication session, the handover events including at least one of a handover from the selected MNO to a second MNO or a handover within the selected MNO.

16. The method of claim 1, wherein formulating at least one option for a communication session further comprises determining an option for a communication session for a subset of the set of MNOs, the subset including available MNOs accessible by the client.

17. The method of claim 1, wherein formulating at least one option for a communication session further comprises determining a subset of the set of MNOs, the subset including omitted MNOs that are not accessible for selection by the client.

18. The method of claim 1, wherein the set of MNOs includes MNOs operated by at least two different service providers.

19. The method of claim 1, wherein a price for the selected communication session is based on a system load for at least one network or a link quality associated with the client.

20. The method of claim 1, wherein the set of MNOs includes MNOs operated by at least two different service providers and using at least two different communication protocols.

21. An apparatus for facilitating communication session access for a client, the apparatus comprising:
an access module operable to:
receive, at a mobile virtual network operator (MVNO), an access request from the client, wherein the MVNO is associated with a set of mobile network operators (MNOs) and wherein the access request is received via a wireless connection between the client and one of the set of MNOs; and
receive, from the client within a client device, client-connection parameters associated with at least one of the set of MNOs;
a connection module operable to formulate at least one option for a communication session over a network associated with at least one of the set of MNOs, the at least one option based on the client-connection parameters and MVNO-connection parameters associated with the set of MNOs; and
an optimizing module operable to optimize the at least one option for the communication session based on resources including link quality, connection cost, and connection strength, wherein final optimization of the at least one option for the communication session is performed at the MVNO and at the client;
wherein the connection module is further operable to establish a selected communication session including the client and a selected MNO of the set of MNOs, based on the at least one option.

22. The apparatus of claim 21, wherein the connection module is further operable to:
formulate a plurality of options for a plurality of communication sessions;
send the plurality of options to the client; and receive an identification of the selected communication session from the plurality of options from the client.

23. The apparatus of claim 21, wherein the connection module is further operable to:
formulate a plurality of options for a plurality of communication sessions; and
select for the client, by the MVNO, the selected communication session selection from the plurality of options for the client by the MVNO.

24. The apparatus of claim 21, wherein the access module further comprises:
a credential manager module operable to:
receive a client credential associated with the client; and
authenticate the client credential for the communication session.

25. The apparatus of claim 21, wherein the access module further comprises:
a credential manager module operable to:
receive from the client access information to access the MVNO via the one of the set of MNOs authorized to communicate with MVNO; and
provide the client with a temporary identification for use in establishing the selected communication session.

26. The apparatus of claim 21, wherein one of the set of MNOs is used by the MVNO as a host MNO for the communication session.

27. The apparatus of claim 21, wherein the client-connection parameters include at least one of:
network availability for at least one network associated with the set of MNOs; or
an estimation of link utilization based on local load level at the client; or
a desired quality of service threshold selected by the client; or
a link quality for a possible communication session over at least one network associated with the set of MNOs.

28. The apparatus of claim 21, wherein the MVNO-connection parameters include at least one of:
network availability for at least one network associated with the set of MNOs; or
an estimation of link utilization based on load level in at least one of the set of MNOs; or
the system load for at least one network associated with the set of MNOs; or
pricing options associated with the set of MNOs.

29. The apparatus of claim 21, wherein the optimizing module operable to optimize is further configured to optimize the at least one option for the communication session to minimize the resources comprises network resources and client resources, where network resources include at least one of network load, cost and price, and where client resources include at least one of client energy use, service quality and price.

30. The apparatus of claim 21 further comprising a handover manager module for switching the client to a second MNO from the set of MNOs during the communication session when the MVNO determines that at least one of the connection parameters associated with the selected MNO reaches a predetermined threshold.

31. The apparatus of claim 30, wherein the predetermined threshold at least one of:
a network signal threshold level; or
a network load threshold level; or
a network price threshold level.

32. The apparatus of claim 21 further comprising a spectrum analyzing module operable to examine spectrum utilization for at least one MNO from the set of MNOs, and dynamically assign the communication session to one of the MNOs based on the spectrum utilization.

33. The apparatus of claim 21 further comprising
a spectrum analyzing module operable to examine spectrum utilization for at least one MNO from the set of MNOs, and statistically multiplex a network for optimally allocating available spectrum, based on the spectrum utilization examination, for at least one MNO from the set of MNOs.

34. The apparatus of claim 21 further comprising a control manager module and a data manager module operable to manage, by the MVNO, control and data flow for the selected communication session between the client and the selected MNO of the set of MNOs, via a data tunnel through the MVNO via a data tunnel through the MVNO.

35. The apparatus of claim 34 further comprising a handover manager module operable to manage, by the MVNO, handover events for the communication session, the handover events including at least one of a handover from the selected MNO to a second MNO and a handover within the selected MNO.

36. The apparatus of claim 21 further comprising a MNO evaluator module operable to determine an option for a communication session for a subset of the set of MNOs, the subset including available MNOs accessible by the client.

37. The apparatus of claim 21 further comprising a MNO evaluator module operable to determine a subset of the set of MNOs, the subset including omitted MNOs that are not accessible for selection by the client.

38. The apparatus of claim 21, wherein the set of MNOs includes MNOs operated by at least two different service providers.

39. The apparatus of claim 21, wherein a price for the selected communication session is based on a system load for at least one network or a link quality associated with the client.

40. The apparatus of claim 21, wherein the set of MNOs includes MNOs operated by at least two different service providers and using at least two different communication protocols.

41. A computer program product, comprising:
a non-transitory computer-readable medium comprising:
a first set of codes for causing a computer to receive, at a mobile virtual network operator (MVNO), an access request from a client, wherein the MVNO is associated with a set of mobile network operators (MNOs) and wherein the access request is received via a wireless connection between the client and one of the set of MNOs;
a second set of codes for causing a computer to receive, from the client, within a client device, client connection parameters associated with at least one of the set of MNOs;
a third set of codes for causing the computer to formulate at least one option for a communication session over a network associated with at least one of the set of MNOs, the at least one option based on the client-connection parameters and MVNO-connection parameters associated with the set of MNOs, wherein to formulate comprises to optimize the at least one option for the communication session based on resources including link quality, connection cost, and connection strength, and wherein final optimization of the at least one option for the communication session is performed at the MVNO and at the client; and a fourth set of codes for causing the computer to establish a selected communication session including the client and a selected MNO of the set of MNOs, based on the at least one option.

42. A method for facilitating access for a client to a communication session through a mobile virtual network operator, the method comprising:
   transmitting from the client within a client device, an access request to a mobile virtual network operator (MVNO), wherein the MVNO is associated with a set of mobile network operators (MNOs) and wherein the access request is transmitted via a wireless connection between the client and one of the set of MNOs;
   optimizing at least one option for a communication session based on connection parameters associated with resources including link quality, connection cost, and connection strength, and wherein final optimization of the at least one option for the communication session is performed at the MVNO and at the client;
   transmitting from the client client-connection parameters associated with at least one of the set of MNOs based on the optimization; and
      establishing a selected communication session including the client and a selected MNO of the set of MNOs over a network associated with the selected MNO.

43. The method of claim 42 further comprising:
   receiving a plurality of options for a plurality of communication sessions; and
   transmitting an identification of the selected communication session from the plurality of options from the client.

44. The method of claim 42 further comprising receiving a selection by the MVNO of selected communication session from a plurality of options.

45. The method of claim 42, wherein transmitting from the client an access request comprising transmitting a client credential associated with the client through at least one of the set of MNOs to the MVNO to allow the MVNO to authenticate the client credential for the communication session.

46. The method of claim 42, wherein transmitting an access request further comprises:
   communicating with a neighboring node;
   receiving access enabling information from the neighboring node, wherein the access enabling information is operable to provide access to a network for the communication session corresponding to at least one of the set of MNOs; and
   transmitting the access enabling information.

47. The method of claim 46, wherein receiving the access enabling information further comprises receiving temporary credentials from the neighboring node.

48. The method of claim 46 wherein communicating with the neighboring node further comprises purchasing an access session from the neighboring node.

49. The method of claim 46 wherein receiving the neighboring node access enabling information further comprises receiving via a wireless communication link between the client and the neighboring node.

50. The method of claim 42, further comprising:
   requesting, by the client, access enabling information for the communication session for a neighboring node from the MVNO;
   receiving, in the client, access enabling information for the communication session for the neighboring node from the MVNO; and
   providing the access enabling information for the communication session to the neighboring node, wherein the access enabling information for the communication session is operable to provide access to a network corresponding to at least one of the set of MNOs.

51. The method of claim 50, wherein receiving access enabling information for the communication session further comprises receiving temporary credentials for the neighboring node.

52. The method of claim 50, wherein requesting access enabling information for the communication session further comprises purchasing a communication session from the MVNO on behalf of the neighboring node.

53. The method of claim 50, wherein providing access enabling information for the communication session to the neighboring node further comprises transmitting via a wireless communication link between the client and the neighboring node the access enabling information for the communication session.

54. The method of claim 42, wherein the client-connection parameters include at least one of:
   network availability for at least one network associated with the set of MNOs; or
   an estimation of link utilization based on local load level at the client; or
   a desired quality of service threshold selected by the client; or
   a link quality for a possible communication session over at least one network associated with the set of MNOs.

55. The method of claim 42, further comprising switching to a second MNO from the set of MNOs during the communication session when it is determined by the MVNO that at least one of the connection parameters associated with the selected MNO reaches a predetermined threshold.

56. The method of claim 55, wherein the predetermined threshold at least one of:
   a network signal threshold level; or
   a network load threshold level; or
   a network price threshold level.

57. The method of claim 42, wherein a price for the selected communication session is based on a system load for at least one network or a link quality associated with the client.

58. The method of claim 42, wherein the set of MNOs further includes a subset of MNOs, the subset of MNOs excluding non-available MNOs not accessible by the client.

59. An apparatus for facilitating access for a client to a communication session through a mobile virtual network operator, the apparatus comprising:
   a transmission module operable to transmit from the client within a client device, an access request to a mobile virtual network operator (MVNO), wherein the MVNO is associated with a set of mobile network operators (MNOs) and wherein the access request is transmitted via a wireless connection between the client and one of the set of MNOs;
   an optimization module operable to formulate at least one option for a communication session comprising optimizing the at least one option for the communication session based on resources including link quality, connection cost, and connection strength, wherein final optimization of the at least one option for the communication session is performed at the MVNO and at the client;
   wherein the transmission module is further operable to transmit from the client the access request including client-connection parameters associated with at least one of the set of MNOs based on the optimization; and
   a connection module operable to establishing a selected communication session including the client and a selected MNO of the set of MNOs over a network associated with the selected MNO of the set of MNOs.

60. The apparatus of claim 59, wherein the connection module is further operable to:
receive a plurality of options for a plurality of communication sessions; and
transmit an identification of the selected communication session from the plurality of options from the client.

61. The apparatus of claim 59, wherein the connection module is further operable to receive a selection by the MVNO of selected communication session from a plurality of options.

62. The apparatus of claim 59, wherein the transmission module is further operable to transmit a client credential associated with the client through at least one of the set of MNOs to the MVNO to allow the MVNO to authenticate the client credential for the communication session.

63. The apparatus of claim 59, wherein the transmission module is further operable to:
communicate with a neighboring node;
receive access enabling information from the neighboring node, wherein the access enabling information is operable to provide access to a network for the communication session corresponding to at least one of the set of MNOs; and
transmit the access enabling information.

64. The apparatus of claim 63, wherein the transmission module is further operable to receive temporary credentials from the neighboring node.

65. The apparatus of claim 63, wherein the transmission module is further operable to purchase an access session from the neighboring node.

66. The apparatus of claim 63, wherein the transmission module is further operable to receive the neighboring node access enabling information via a wireless communication link between the client and the neighboring node.

67. The apparatus of claim 59, wherein the transmission module is further operable to:
request access enabling information for the communication session for a neighboring node from the MVNO;
receive access enabling information for the communication session for the neighboring node from the MVNO; and
provide the access enabling information for the communication session to the neighboring node, wherein the access enabling information for the communication session is operable to provide access to a network corresponding to at least one of the set of MNOs.

68. The apparatus of claim 67, wherein the transmission module is further operable to receive temporary credentials for the neighboring node.

69. The apparatus of claim 67, wherein the transmission module is further operable to:
purchase a communication session from the MVNO on behalf of the neighboring node.

70. The apparatus of claim 67, wherein the transmission module is further operable to transmit the neighboring node access enabling information via a wireless communication link between the client and the neighboring node the access enabling information for the communication session.

71. The apparatus of claim 59, wherein the client-connection parameters include at least one of:
network availability for at least one network associated with the set of MNOs; or
an estimation of link utilization based on local load level at the client; or
a desired quality of service threshold selected by the client; or
a link quality for a possible communication session over at least one network associated with the set of MNOs.

72. The apparatus of claim 59, wherein the connection module is further configurable to allow switching to a second MNO from the set of MNOs during the communication session when it is determined by the MVNO that at least one of the connection parameters associated with the selected MNO reaches a predetermined threshold.

73. The apparatus of claim 72, wherein the predetermined threshold includes at least one of:
a network signal threshold level; or
a network load threshold level; or
a network price threshold level.

74. The apparatus of claim 59, wherein a price for the selected communication session is based on a system load for at least one network or a link quality associated with the client.

75. The apparatus of claim 59, wherein the set of MNOs further includes a subset of MNOs, the subset of MNOs excluding non-available MNOs not accessible by the client.

76. A computer program product, comprising:
a non-transitory computer-readable medium comprising:
a first set of codes for causing a computer to transmit from the client an access request to a mobile virtual network operator (MVNO), wherein the MVNO is associated with a set of mobile network operators (MNOs) and wherein the access request is transmitted via a wireless connection between the client and one of the set of MNOs;
a second set of codes for causing the computer to optimize at least one option for a communication session based on resources including link quality, connection cost, and connection strength, wherein final optimization of the at least one option for the communication session is performed at the MVNO and at the client;
a third set of codes for causing the computer to transmit from the client client-connection parameters associated with at least one of the set of MNOs based on the optimization; and
a fourth set of codes for causing the computer to establish a selected communication session including the client and a selected MNO of the set of MNOs over a network associated with the selected MNO.

77. An apparatus, comprising:
a transmitter for transmitting from a client an access request to a mobile virtual network operator (MVNO), wherein the MVNO is associated with a set of mobile network operators (MNOs) and wherein the access request is transmitted via a wireless connection between the client and one of the set of MNOs; and
a processor coupled to the transmitter for optimizing at least one option for a communication session based on resources including link quality, connection cost, and connection strength, wherein final optimization of the at least one option for the communication session is performed at the MVNO and at the client;
wherein the transmitter is further configured for transmitting client-connection parameters associated with at least one of the set of MNOs based on the optimization; and
wherein the processor is further configured for establishing a selected communication session including the client and a selected MNO of the set of MNOs over a network associated with the selected MNO.

* * * * *